US012795389B2

(12) United States Patent
Raghavan et al.

(10) Patent No.: US 12,795,389 B2
(45) Date of Patent: Nov. 10, 2026

(54) DETERMINISTIC BEAM MANAGEMENT FOR MULTIPLE ANTENNA ARRAYS SUPPORTING A PLURALITY OF FREQUENCY BANDS

(71) Applicant: QUALCOMM Incorporated, San Diego, CA (US)

(72) Inventors: Vasanthan Raghavan, West Windsor Township, NJ (US); Mohammad Ali Tassoudji, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 504 days.

(21) Appl. No.: 18/162,357

(22) Filed: Jan. 31, 2023

(65) Prior Publication Data

US 2024/0259832 A1 Aug. 1, 2024

(51) Int. Cl.

*H04W 16/28* (2009.01)
*H04B 7/06* (2006.01)
*H04W 8/22* (2009.01)

(52) U.S. Cl.

CPC .......... *H04W 16/28* (2013.01); *H04B 7/0617* (2013.01); *H04W 8/22* (2013.01)

(58) Field of Classification Search

CPC ........... H04W 74/004; H04W 74/0833; H04W 48/12; H04W 74/0836; H04W 74/0838; H04W 24/02; H04L 1/08; H04L 1/1887; H04L 1/189; H04L 1/1893; H04L 5/0091; H04L 5/1469; H04L 1/1812; H04L 5/0055

See application file for complete search history.

(56) References Cited

U.S. PATENT DOCUMENTS

| | | | | |
|---|---|---|---|---|
| 2022/0116790 | A1* | 4/2022 | Firouzbakht | H01Q 5/307 |
| 2022/0217746 | A1* | 7/2022 | Kang | H04B 7/0404 |
| 2024/0155408 | A1* | 5/2024 | Tidestav | H04B 7/0696 |

FOREIGN PATENT DOCUMENTS

| | | | | |
|---|---|---|---|---|
| CN | 112822695 A | * | 5/2021 | H04B 7/06952 |
| CN | 115442190 A | * | 12/2022 | H04L 25/0204 |
| CN | 117729636 A | * | 3/2024 | H04L 5/0048 |

(Continued)

OTHER PUBLICATIONS

Machine Translation of CN 112822695 A (Year: 2019).*

(Continued)

*Primary Examiner* — Hashim S Bhatti
*Assistant Examiner* — Noah James Sugden
(74) *Attorney, Agent, or Firm* — Polsinelli

(57) ABSTRACT

In an aspect, a first network entity transmits, to a second network entity, beam management capability information including information indicative that the first network entity includes a first antenna array and a second antenna array. The first antenna array supports operation in a first frequency band and the second antenna array supports operation in a second frequency band. The first network entity determines a first beam in the first frequency band based on beam training information corresponding to the first frequency band. The first network entity determines a second beam based on the first beam. The second beam is in the second frequency band. The first network entity transmits, to the second network entity, information indicative of the second beam.

29 Claims, 16 Drawing Sheets

(56) References Cited

FOREIGN PATENT DOCUMENTS

| | | | | |
|---|---|---|---|---|
| CN | 118118061 A * | 5/2024 | ............ | H04W 16/28 |
| KR | 102010559 B1 * | 8/2019 | .......... | H04W 72/046 |

OTHER PUBLICATIONS

Machine Translation of CN 115442190 A (Year: 2021).*

Machine Translation of CN 117729636 A (Year: 2022).*

Machine Translation of CN 118118061 A (Year: 2022).*

Machine Translation of KR 102010559 B1 (Year: 2019).*

Huawei, et al., "Low latency of Scell Activation", 3GPP TSG RAN WG1 Meeting #96, R1-1901581, 3rd Generation Partnership Project, Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019, 4 Pages, XP051599278, p. 3 figures 2, 3.

International Search Report and Written Opinion—PCT/US2024/011874—ISA/EPO—May 16, 2024.

* cited by examiner

DETERMINISTIC BEAM MANAGEMENT FOR MULTIPLE ANTENNA ARRAYS SUPPORTING A PLURALITY OF FREQUENCY BANDS

TECHNICAL FIELD

The present disclosure relates generally to communication systems, and more particularly, to wireless communication including beam management.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus at a first network entity, such as a user equipment (UE), is provided. The apparatus may include a first antenna array including a first plurality of antenna elements, a second antenna array including a second plurality of antenna elements, a memory and at least one processor coupled to the memory. The at least one processor may be configured to cause transmission, to a second network entity, of beam management capability information including first information indicative that the first network entity includes the first antenna array and the second antenna array, the first antenna array being configured to support operation in a first frequency band and the second antenna array being configured to support operation in a second frequency band. The at least one processor may also be configured to determine a first beam in the first frequency band based on beam training information corresponding to the first frequency band. The at least one processor may also be configured to determine a second beam based on the first beam, the second beam being in the second frequency band. The at least one processor may also be configured to cause transmission, to the second network entity, of information indicative of the second beam.

In an aspect of the disclosure, a method, a computer-readable medium, and an apparatus at a first network entity, such as a network node, is provided. The apparatus may include a memory and at least one processor coupled to the memory. The at least one processor may be configured to receive beam management capability information including first information indicative that a second network entity includes a first antenna array including a first plurality of antenna elements and a second antenna array including a second plurality of antenna elements, the first antenna array being configured to support operation in a first frequency band and the second antenna array being configured to support operation in a second frequency band. The at least one processor may also be configured to perform a beam training procedure for the first frequency band, the beam training procedure being configured to enable the second network entity to determine a first beam in the first frequency band. The at least one processor may also be configured to receive second information indicative of a second beam based on the first beam, where the second beam is in the second frequency band. To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
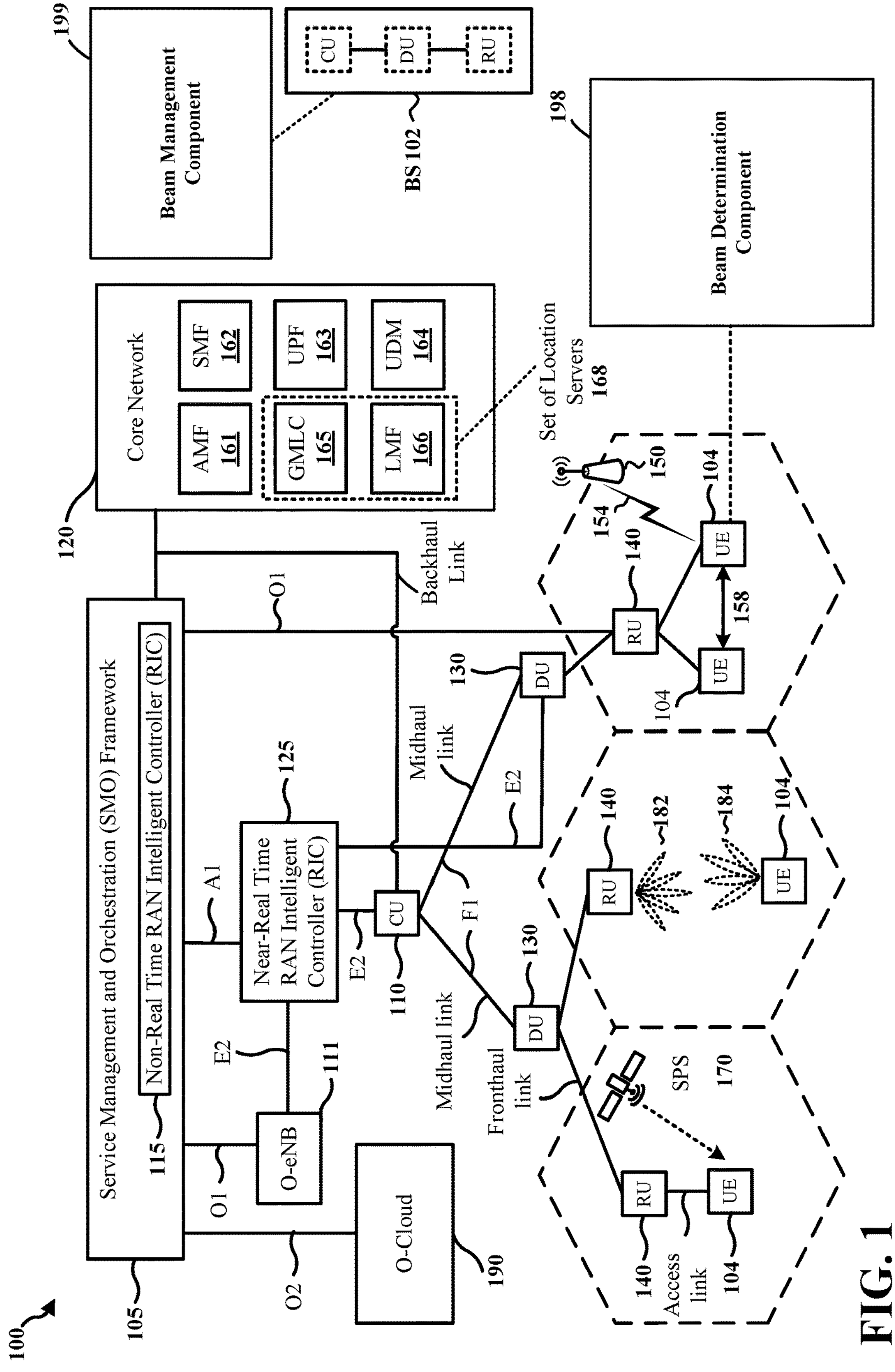
FIG. 1 is a diagram illustrating an example of a wireless communications system and an access network.

Various aspects relate generally to wireless communication and particularly to deterministic beam management for multiple antenna arrays supporting a plurality of frequency bands. Some aspects more specifically relate to determining a beam for one frequency band based on a beam determined for another frequency band via beam training. In some examples, a first antenna array of a UE may support operation in a first frequency band, and a second antenna array of the UE may support operation in a second frequency band. The UE may determine a first beam in the first frequency band via a beam training procedure performed for the first antenna array. The UE may then deterministically determine a second beam in the second frequency band based on characteristics of the first beam (e.g., a coverage region of the first beam) and characteristics of the first antenna array and the second antenna array (e.g., an angle of separation between the first antenna array and the second antenna). The UE may deterministically determine the second beam without performing a beam training procedure for the second antenna array.

Particular aspects of the subject matter described in this disclosure can be implemented to realize one or more of the following potential advantages. In some examples, by deterministically determining a particular beam for a particular frequency band rather than determining a beam via a beam training procedure, aspects provided herein can reduce the reference signal resources, latencies, power/thermal overheads, bootstrapping across frequencies, processing cycles, etc., that are normally incurred during the beam training procedure.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via 01) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a beam determination component 198 that may be configured to cause transmission, to a second network entity, of beam management capability information including first information indicative that the first network entity includes the first antenna array and the second antenna array, the first antenna array being configured to support operation in a first frequency band and the second antenna array being configured to support operation in a second frequency band, to determine a first beam in the first frequency band based on beam training information corresponding to the first frequency band, to determine a second beam based on the first beam, the second beam being in the second frequency band, and cause transmission, to the second network entity, of information indicative of the second beam. In certain aspects, the base station 102 may have a beam management component 199 that may be configured to receive beam management capability information including first information indicative that a second network entity includes a first antenna array including a first plurality of antenna elements and a second antenna array including a second plurality of antenna elements, the first antenna array being configured to support operation in a first frequency band and the second antenna array being configured to support operation in a second frequency band, to perform a beam training procedure for the first frequency band, the beam training procedure being configured to enable the second network entity to determine a first beam in the first frequency band, and to receive second information indicative of a second beam based on the first beam, where the second beam is in the second frequency band.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Figure 2A:
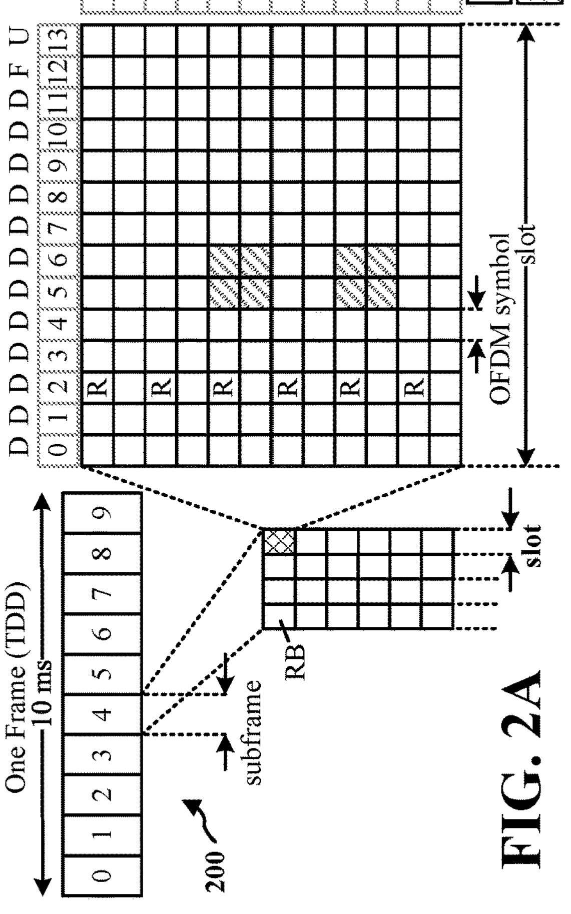
FIG. 2A is a diagram illustrating an example of a first frame, in accordance with various aspects of the present disclosure.
Figure 2B:
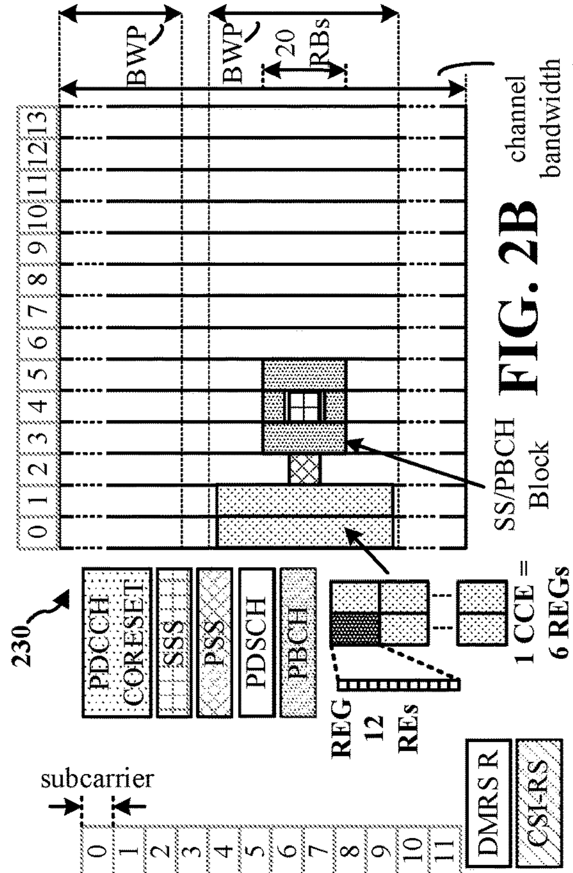
FIG. 2B is a diagram illustrating an example of downlink (DL) channels within a subframe, in accordance with various aspects of the present disclosure.
Figure 2C:
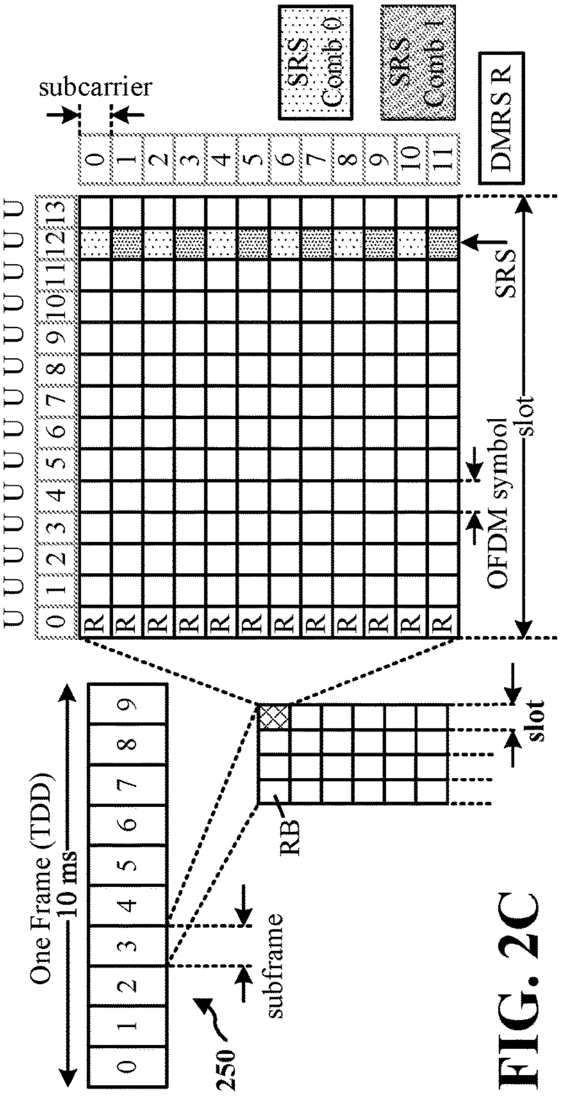
FIG. 2C is a diagram illustrating an example of a second frame, in accordance with various aspects of the present disclosure.
Figure 2D:
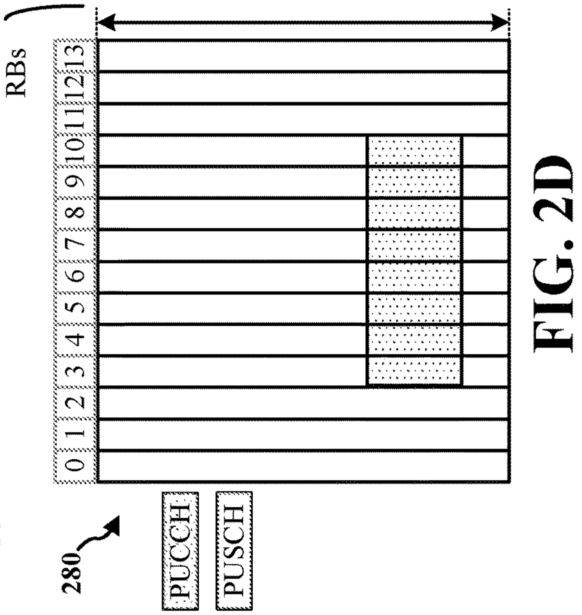
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
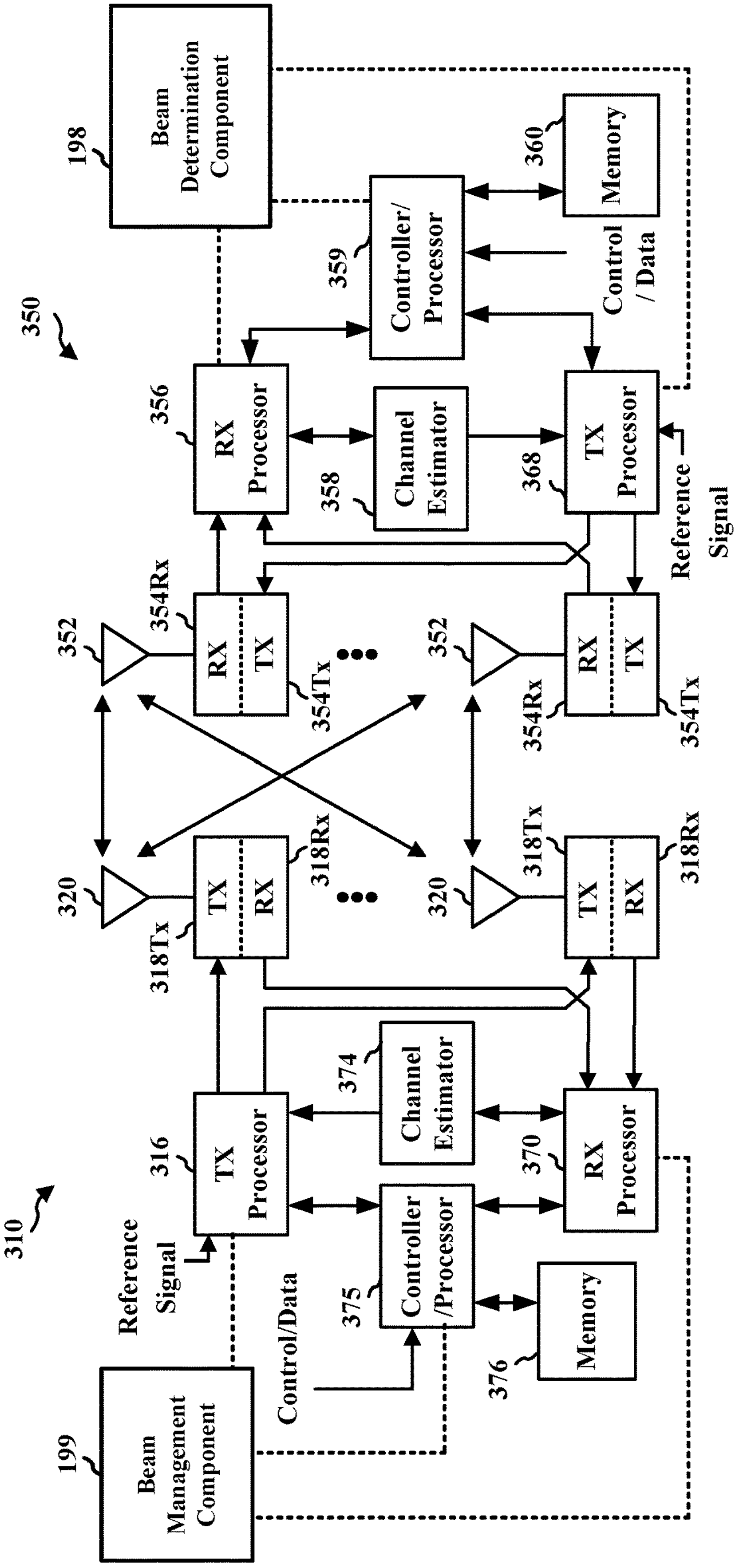
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the beam determination component 198 of FIG. 1.

At least one of the TX processor 316, the RX processor 370, and the controller/processor 375 may be configured to perform aspects in connection with the beam management component 199 of FIG. 1.

Figure 4:
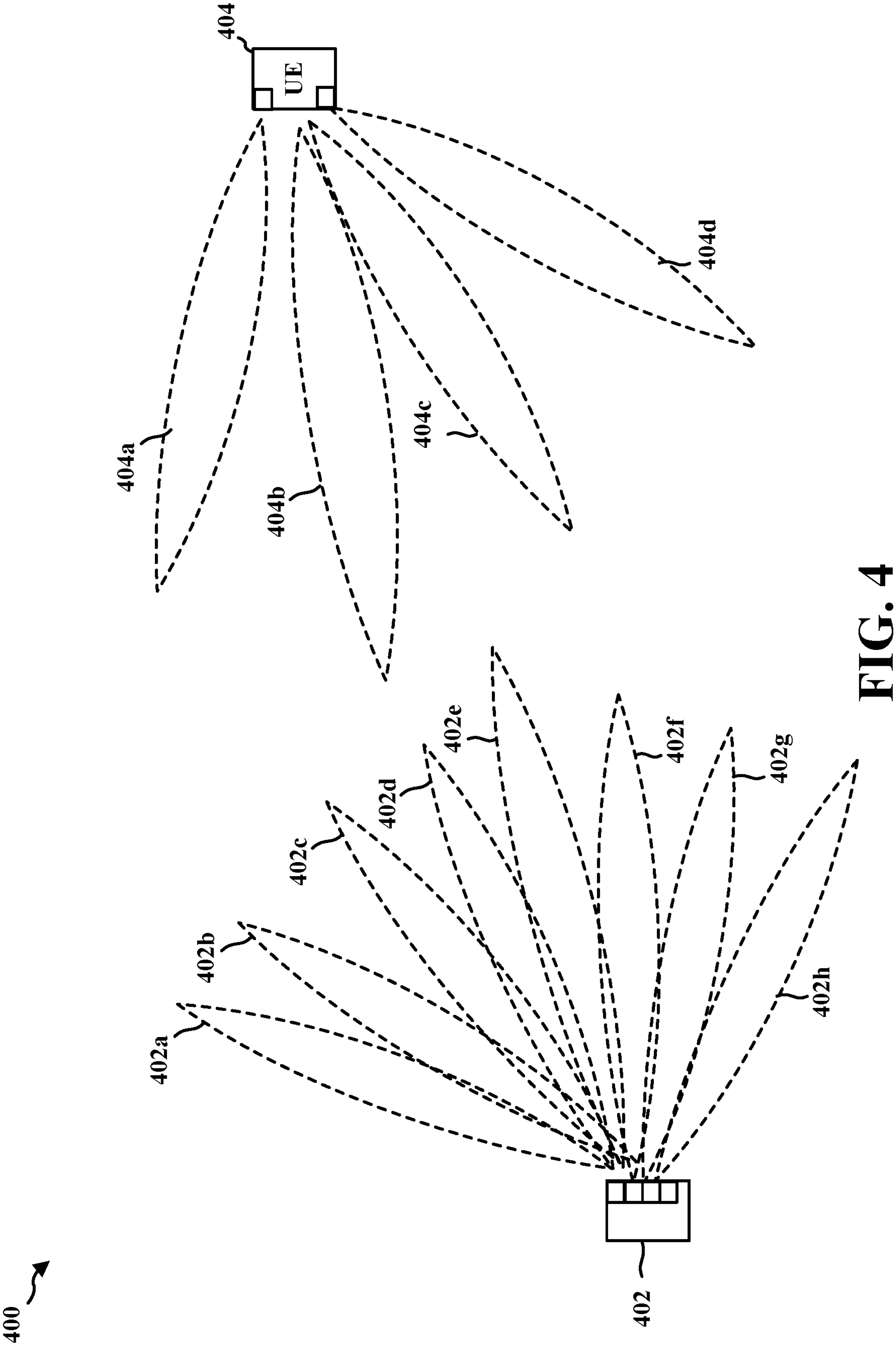
FIG. 4 is a diagram illustrating a base station in communication with a UE.

FIG. 4 is a diagram 400 illustrating a base station 402 in communication with a UE 404. Referring to FIG. 4, the base station 402 may transmit a beamformed signal to the UE 404 in one or more of the directions 402*a*, 402*b*, 402*c*, 402*d*, 402*e*, 402*f*, 402*g*, 402*h*. The UE 404 may receive the beamformed signal from the base station 402 in one or more receive directions 404*a*, 404*b*, 404*c*, 404*d*. The UE 404 may also transmit a beamformed signal to the base station 402 in one or more of the directions 404*a*-404*d*. The base station 402 may receive the beamformed signal from the UE 404 in one or more of the receive directions 402*a*-402*h*. The base station 402/UE 404 may perform beam training to determine the best receive and transmit directions (e.g., the best transmit and receive beams) for each of the base station 402/UE 404. The transmit and receive directions for the base station 402 may or may not be the same. The transmit and receive directions for the UE 404 may or may not be the same. In one example, the base station 402 may initiate beam training by transmitting one or more reference signals (e.g., CSI-RSs, SSBs, etc.) via one or more transmit beams. For each of the transmit beam(s), the UE 404 may rotate through its receive beams. For each transmit beam/receive beam pair, the UE 404 may generate beam training information. The beam training information may include measurement information. The UE 404 may generate the measurement information by performing one or more measurements for a certain metric, such as a signal-to-noise ratio (SNR) metric, a signal-to-interference-plus-noise (SINR) metric, a reference signal received power (RSRP) metric, a received signal strength indicator (RSSI), a spectral efficiency over polarization MIMO (pol-MIMO) metric, or the like. The UE 404 may determine a transmit beam/receive beam pair for transmitting and/or receiving signals based on the beam training information. For example, the UE 404 may analyze the respective measurement information generated for each transmit beam/receive beam pair and determine which measurement information is representative of the most ideal (e.g., the most optimal or highest) quality with respect to the metric. The UE may select the transmit beam/receive beam pair that is associated with such measurement information.

In response to different conditions, the UE 404 may determine to switch beams, e.g., between beams 402*a*-402*h*. The beam at the UE 404 may be used for reception of downlink communication and/or transmission of uplink communication. In some examples, the base station 402 may send a transmission that triggers a beam switch by the UE 404. For example, the base station 402 may indicate a transmission configuration indication (TCI) state change, and in response, the UE 404 may switch to a new beam for the new TCI state of the base station 402. In some instances, a UE may receive a signal, from a base station, configured to trigger a transmission configuration indication (TCI) state change via, for example, a MAC control element (CE) command. The TCI state change may cause the UE to find the best UE receive beam corresponding to the TCI state from the base station, and switch to such beam. Switching beams may allow for enhanced or improved connection between the UE and the base station by ensuring that the transmitter and receiver use the same configured set of beams for communication.

Millimeter wave beamforming may cover a single or a proximate set of frequencies in FR2 (e.g., bands n257 (ranging between 26.50 GHz-29.50 GHz), n258 (ranging between 24.25 GHz-27.50 GHz), n261 (ranging between 27.50 GHZ-28.35 GHz), bands, n259 (ranging between 39.50 GHZ-43.50 GHz), n260 (ranging between 37.00 GHz-40.00 GHz), etc.). Additional frequencies (e.g., FR3) may also be supported in 5G-advanced, 6G, etc.

Supporting FR2-1 (24.25 GHz-52.6 GHz), FR2-2 (52.6 GHz-71 GHz), and FR3 (7.125 GHz-24.25 GHz) with different antenna modules (or arrays) at a UE may be difficult, as UEs generally have smaller form factors that do not afford much space (or real estate) to include additional antenna modules. Moreover, designing new/different antenna modules to cover different sets of frequencies may be challenging. For example, a different RF integrated circuit (RFIC) is expensive in terms of design (e.g., design time, process over-runs, etc.) and cost. There is no easily affordable real estate at the UE to deploy another antenna module spanning a different frequency range. In addition, beam/antenna module switching control is complex. One solution is to utilize a co-located multi-band antenna module supporting at least a first frequency band corresponding to a first frequency range and a second frequency band corresponding to a second frequency range. In some aspects, the first frequency band and the second frequency band may be the same frequency band within the same frequency range. In other aspects, the first frequency band and the second frequency band may be different frequency bands, where the first frequency band is within a first frequency range and the second frequency band is within a second frequency range that is different than the first frequency range (i.e., the first and second frequency ranges are non-overlapping). In additional aspects, the first frequency band and the second frequency band may be different frequency bands within the same frequency range. In further aspects, the first frequency band may at least partially overlap with the second frequency band, for example, within the same frequency range or cross-frequency range.

Figure 5B:
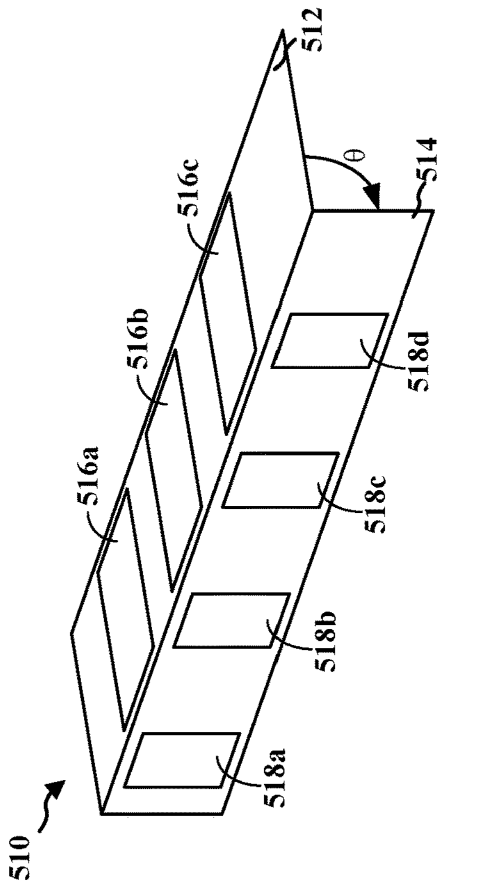
FIGS. 5A-5C are diagrams of example multi-band antenna modules in accordance with various aspects of the present disclosure.
Figure 5A:
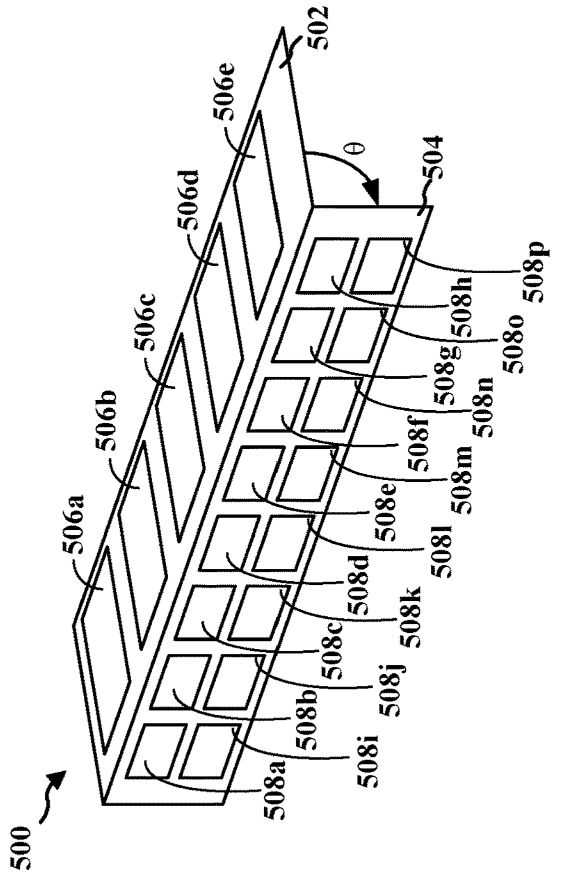
Figure 5C:
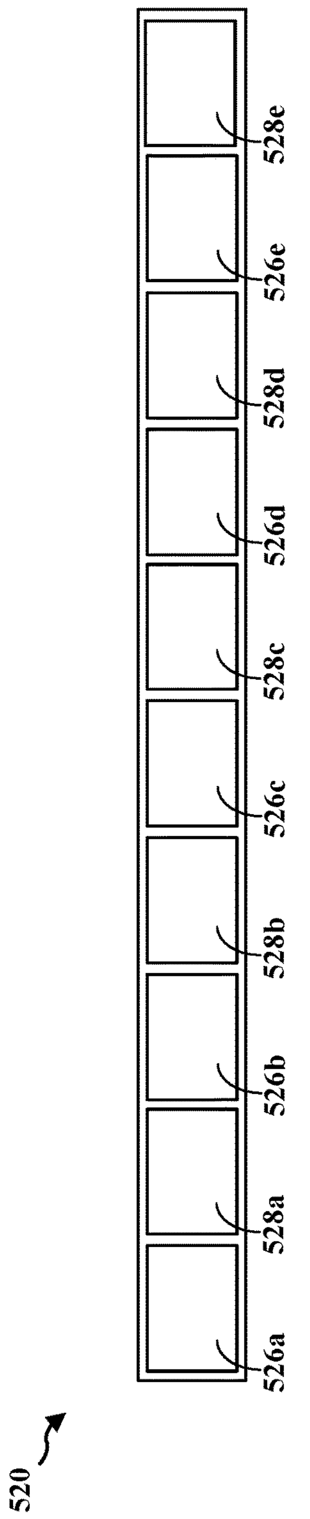

FIGS. 5A-5C are diagrams of example multi-band antenna modules 500, 510, and 520 in accordance with various aspects of the present disclosure. As shown in FIG. 5A, the multi-band antenna module 500 may include a first antenna array 502 and a second antenna array 504. The first antenna array 502 may include a plurality of antenna elements 506*a*, 506*b*, 506*c*, 506*d*, and 506*e*, and the second antenna array 504 may include a plurality of antenna elements 508*a*, 508*b*, 508*c*, 508*d*, 508*e*, 508*f*, 508*g*, 508*h*, 508*i*, 508*j*, 508*k*, 508*l*, 508*m*, 508*n*, 508*o*, and 508*p*. Each antenna element of the plurality of antenna elements 506*a*, 506*b*, 506*c*, 506*d*, and 506*e* and the plurality of antenna elements 508*a*, 508*b*, 508*c*, 508*d*, 508*e*, 508*f*, 508*g*, 508*h*, 508*i*, 508*j*, 508*k*, 508*l*, 508*m*, 508*n*, 508*o*, and 508*p* may be referred to as an antenna, an antenna port, or a port. Although the first antenna array 502 is illustrated as having five antenna elements and the second antenna array 504 is illustrated as having 16 antenna elements, in other examples, the first antenna array 502 and the second antenna array 504 may include fewer antenna elements or more antenna elements. It is noted that each of the antenna elements described herein may include one or more sub-elements (e.g., power amplifiers, digital-to-analog converters, etc.).

In some aspects, the first antenna array 502 may be configured to support operation (e.g., to transmit and receive signals) in a first frequency band (e.g., FR2-1), and the second antenna array 504 may be configured to support operation (e.g., to transmit and receive signals) in a second frequency band (e.g., FR2-2). As also shown in FIG. 5A, the first antenna array 502 and the second antenna array 504 may be oriented in different directions such that each of the antenna arrays have different boresight directions (or boresight directions that exceed a threshold angle $\theta$). Example values for threshold angle $\theta$ may include 70 degrees, 75 degrees, 80 degrees, 85 degrees, 90 degrees, 95 degrees, 100 degrees, etc.

As shown in FIG. 5B, the multi-band antenna module 510 may be a dual-polarized (e.g., a horizontal polarization and a vertical polarization) phased array antenna module that includes a first antenna array 512 and a second antenna array 514. The first antenna array 512 may include a plurality of antenna elements 516*a*, 516*b*, and 516*c*, and the second antenna array 514 may include a plurality of antenna elements 518*a*, 518*b*, 518*c*, and 518*d*. Although the first antenna array 512 is illustrated as having three antenna elements and the second antenna array 514 is illustrated as having four antenna elements, in other examples, the first antenna array 512 and the second antenna array 514 may include fewer antenna elements or more antenna elements.

In some aspects, the first antenna array 512 may be configured to support operation (e.g., to transmit and receive signals) in a first frequency band (e.g., FR3), and the second antenna array 514 may be configured to support operation (e.g., to transmit and receive signals) in a second frequency band (e.g., FR2-1). As also shown in FIG. 5B, the first antenna array 512 and the second antenna array 514 may be oriented in different directions such that each of the antenna arrays have different boresight directions (or boresight directions that exceed a threshold angle θ). Example values for threshold angle θ may include 70 degrees, 75 degrees, 80 degrees, 85 degrees, 90 degrees, 95 degrees, 100 degrees, etc.

As shown in FIG. 5C, the multi-band antenna module 520 may include a first antenna array and a second antenna array. The first antenna array may include a plurality of antenna elements 526*a*, 526*b*, 526*c*, 526*d*, and 526*e*, and the second antenna array 504 may include a plurality of antenna elements 528*a*, 528*b*, 528*c*, 528*d*, and 528*e*. Although each of the first antenna array and the second antenna array is illustrated as having five antenna elements, in other examples, the first antenna array and the second antenna array may include fewer antenna elements or more antenna elements.

In some aspects, the plurality of antenna elements 526*a*, 526*b*, 526*c*, 526*d*, and 526*e* of the first antenna array may be configured to support operation (e.g., to transmit and receive signals) in a first frequency band (e.g., a relatively low frequency band (e.g., 24-29.5 GHZ), and the plurality of antenna elements 528*a*, 528*b*, 528*c*, 528*d*, and 528*e* of the second antenna array may be configured to support operation (e.g., to transmit and receive signals) in mid-to-high frequency bands (e.g., 37 GHz-43 GHz and/or 47.2 GHz-48.2 GHz)). As also shown in FIG. 5C, the plurality of antenna elements 526*a*, 526*b*, 526*c*, 526*d*, and 526*e* of the first antenna array and the plurality of antenna elements 528*a*, 528*b*, 528*c*, 528*d*, and 528*e* of the second antenna array may be oriented in the same direction such that both antenna arrays have the same boresight direction (or a similar boresight direction that is within a threshold angle (e.g., within 5 or 10 degrees). Although FIG. 5C illustrates a consecutive set of antenna elements which alternate between low frequency band elements and mid-to-high frequency band elements, in other examples, other configurations may be supported. For example, the plurality of antenna elements 526*a*, 526*b*, 526*c*, 526*d*, and 526*e* may be grouped together such that they are consecutively placed with respect to each other. Similarly, the plurality of antenna elements 528*a*, 528*b*, 528*c*, 528*d*, and 528*e* may also be grouped together such that they are consecutively placed with respect to each other. In another example, the first plurality of antenna elements 526*a*, 526*b*, 526*c*, 526*d*, and 526*e* may be placed in a first column or row, and the plurality of antenna elements 528*a*, 528*b*, 528*c*, 528*d*, and 528*e* may be placed in a second column or row that is proximate to (e.g., adjacent) to the first column or row.

Figure 6A:
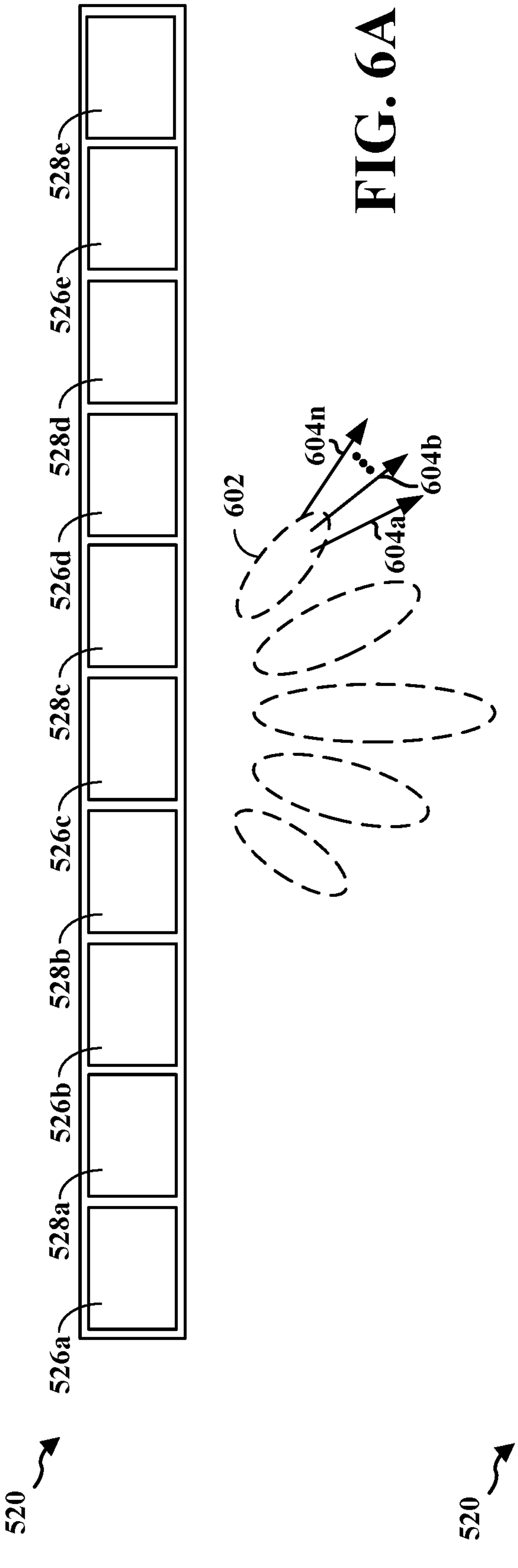
FIGS. 6A-6B are diagrams illustrating deterministic beam determination for a multi-band antenna module in accordance with various aspects of the present disclosure.
Figure 6B:
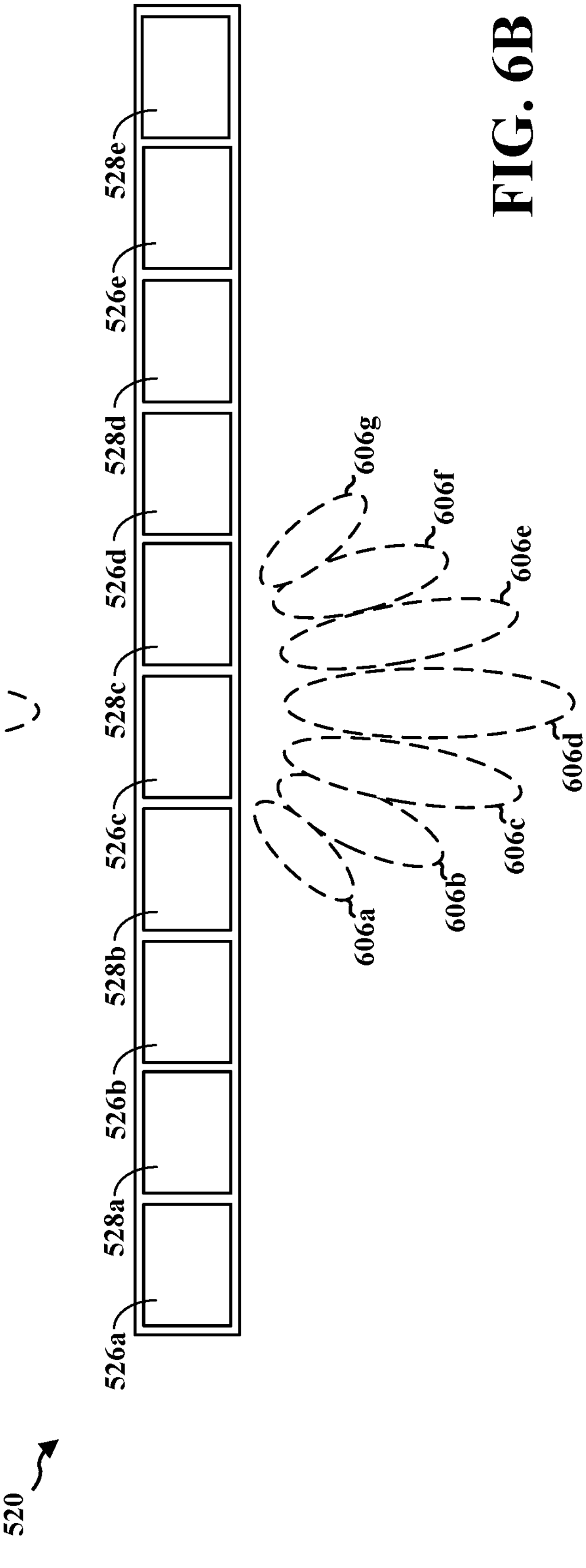

A multi-band antenna module's configuration or geometry may allow deterministic beam management properties that may be leveraged to speed up beamforming processes at different frequencies. For example, FIGS. 6A-6B are diagrams illustrating deterministic beam determination (e.g., selection) for the multi-band antenna module 520 in accordance with various aspects of the present disclosure. As shown in FIGS. 6A-6B, the plurality of antenna elements 526*a*, 526*b*, 526*c*, 526*d*, and 526*e* of the first antenna array and the plurality of antenna elements 528*a*, 528*b*, 528*c*, 528*d*, and 528*e* of the second antenna array may be oriented in the same direction such that both antenna arrays have the same boresight direction (or boresight directions within a threshold angle), as described above with reference to FIG. 5C. As shown in FIG. 6A, the first antenna array may utilize a first number of beams ($K_1$) (e.g., 5 beams) to scan the first frequency band, and the second antenna array may utilize a second number of beams ($K_2$) (e.g., 7 beams) to scan the second frequency band.

A network node may initiate beam training for the first frequency band, for example, by transmitting one or more reference signals (e.g., CSI-RSs, SSBs, etc.) via the first frequency band. A UE in which the multi-band antenna module 520 is included may determine that a particular beam index i (where a beam is denoted as $f_i$) works best for the first frequency band to optimize a certain metric (e.g., SNR, SINR, RSRP, RSSI, etc.) of the reference signal(s). The UE may then deterministically determine a particular beam index j* (where $1 \leq j^* \leq K_2$) corresponding to a beam $g_i^*$ in the second frequency band that maximizes the projection of energy along the set of directions corresponding to the beam index i (determined for the first frequency band) for communications in the second frequency band. That is, the UE determines a beam in the second frequency band based on an ideal (e.g., optimal) beam determined in the first frequency band. The deterministic selection is performed without an explicit beam training procedure in the second frequency band.

In an aspect, the UE may determine the beam index j* in accordance with Equation 1, which is provided below:

$$j^* = \arg \max_{1 \leq j \leq K_2} \sum_{k\,:\,\theta_k \in \text{ Coverage Region of } f_i} w_k \left| g_j^H a(\theta_k) \right|^2 \quad \text{(Eq. 1)}$$

where $w_k$ represents a respective weight for a particular direction ($\theta_k$) in the coverage region of $f_i$ (i.e., the beam index of the optimal beam determined in the first frequency band), $$g_j^H$$

represents a respective conjugate transpose (e.g., a Hermitian (H) transpose) of a beamforming vector representing a candidate beam in the second frequency band, and $a(\theta_k)$ represents a respective steering vector (e.g., representing the set of phase delays at each antenna element of the second antenna array of the multi-band antenna module 520) associated with a particular direction ($\theta_k$) in the coverage region of $f_i$. In some aspects, the value of one or more respective weights $w_k$ for one or more respective directions may be signaled to the UE by the network node. In other aspects, one or more respective weights $w_k$ for one or more respective direction may be configured independent of signaling from the second network entity (e.g., one or more weights may be hard-coded or stored at the UE, for example, by the manufacturer).

In accordance with Equation 1, for each of the candidate beams 606*a*, 606*b*, 606*c*, 606*d*, 606*e*, 606*f*, and 606*g* of the plurality of beams ($K_2$) in the second frequency band, the UE may determine a respective projection of energy of the candidate beam in a coverage region of the beam determined in the first frequency band. For example, suppose the UE determines that a beam 602 is ideal in the first frequency band via beam training. The UE may determine a respective projection of energy in the coverage region of the beam 602 for each of the candidate beams 606*a*, 606*b*, 606*c*, 606*d*, 606*e*, 606*f*, and 606*g* of the second frequency band. To determine a respective projection of energy for a particular beam of the candidate beams 606*a*, 606*b*, 606*c*, 606*d*, 606*e*, 606*f*, and 606*g* the UE may, for each of directions 604*a*, 604*b*, . . . , 604*n* in the coverage region of the beam 602, determine the conjugate transpose of a beamforming vector representing the candidate beam (i.e., $$g_j^H$$

The UE may combine (e.g., take the dot product of) the conjugate transpose of the beamforming vector with the steering vector associated with a particular direction to generate a respective combined value. The UE may then apply the respective weight associated with the particular direction ($w_k$) to the respective combined value. The UE may combine (e.g., add) each of the weighted combined values determined for a respective direction of the directions 604*a*, 604*b*, . . . , 604*n*. The resulting value may be the projection of energy of the particular candidate beam in the coverage region of the beam 602. The UE may perform the foregoing process for each of the candidate beams 606*a*, 606*b*, 606*c*, 606*d*, 606*e*, 606*f*, and 606*g*. The UE may select a candidate beam of the candidate beams 606*a*, 606*b*, 606*c*, 606*d*, 606*e*, 606*f*, and 606*g* having the largest projection of energy as the beam index j* for the second frequency band.

After beam index j* is determined, in some instances, there may no change in the TCI state (at the network node) that corresponds to the beam identified by the beam index j* because the two antenna arrays are oriented along the same or similar direction(s). In accordance with such an aspect, a change in the beam of a UE may be associated with a switch in frequencies. However, the change may not be indicated by a TCI state switch. Thus, there may be no beam switch at the network node when the two antenna arrays are oriented along the same or similar direction(s).

It is noted that while the foregoing describes determining a beam in the first frequency band via beam training and deterministically selecting a beam in the second frequency band based on the beam determined in the first frequency band, in other examples, the beam in the second frequency band may be determined via beam training and the beam in the first frequency band may be deterministically selected based on the beam determined in the second frequency band.

Figure 7:
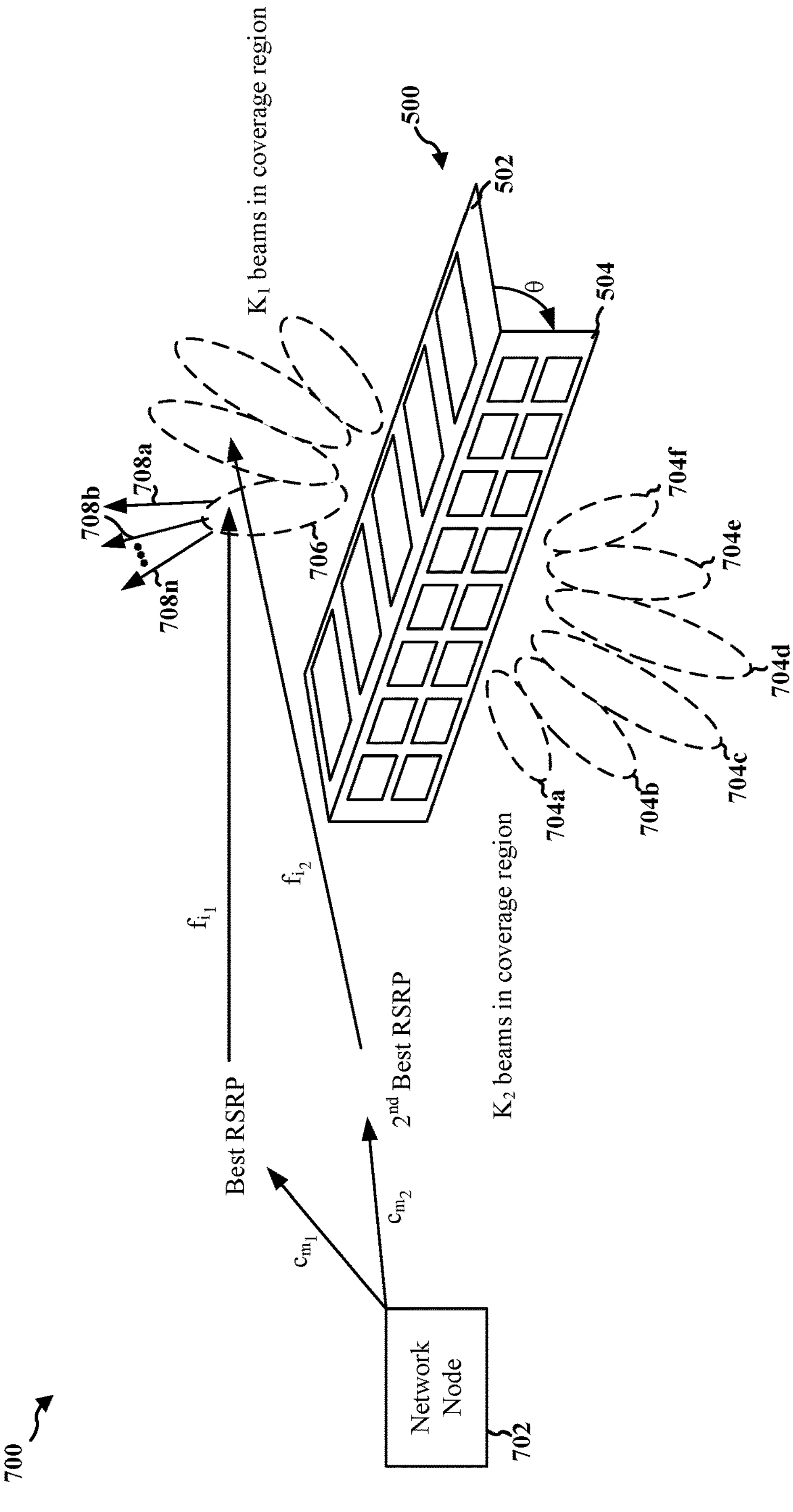
FIG. 7 is a diagram illustrating deterministic beam determination for a multi-band antenna module in accordance with various aspects of the present disclosure.

FIG. 7 is a diagram 700 illustrating deterministic beam determination (e.g., selection) for the multi-band antenna module 500 in accordance with various aspects of the present disclosure. As shown in FIG. 7, the plurality of antenna elements (i.e., antenna elements 506*a*, 506*b*, 506*c*, 506*d*, and 506*e*, as shown in FIG. 5A) of the first antenna array 502 and the plurality of antenna elements (i.e., antenna elements 508*a*, 508*b*, 508*c*, 508*d*, 508*e*, 508*f*, 508*g*, 508*h*, 508*i*, 508*j*, 508*k*, 508*l*, 508*m*, 508*n*, 508*o*, and 508*p*, as shown in FIG. 5A) of the second antenna array 504 may be oriented in different directions such that each of the antenna arrays have different boresight directions (or boresight directions that exceed the threshold angle θ), as described above with reference to FIG. 5A. As shown in FIG. 7, the first antenna array 502 may utilize a first number of beams ($K_1$) (e.g., 4 beams) to scan the first frequency band, and the second antenna array 504 may utilize a second number of beams ($K_2$) (e.g., 6 beams) to scan the second frequency band.

A network node 702 may initiate beam training for the first frequency band, for example, by transmitting one or more reference signals (e.g., CSI-RSs, SSBs, etc.) via the first frequency band. A UE in which the multi-band antenna module 500 is included may determine that a particular beam index i (where a beam is denoted as $f_i$) of a receive beam that works best in the first frequency band to optimize a certain metric (e.g., SNR, SINR, RSSI, RSRP, etc.) with respect to the reference signal(s). In the example shown in FIG. 7, the UE may determine that the beam $f_{i_1}$ 706 is the ideal beam in the first frequency band. The UE may also determine a transmit beam (e.g., $c_{m_1}$) of the network node 702 corresponding to the receive beam $f_{i_1}$ 706, as described above with reference to FIG. 4. That is, the UE may determine a transmit and receive beam pair in the first frequency band that works best in the first frequency band to optimize the certain metric. In an example in which the metric is RSRP, the most ideal transmit and receive beam pair may be represented as RSRP ($f_{i_1}$, $c_{m_1}$). Similarly, the second most ideal transmit and receive beam pair may be represented as RSRP ($f_{i_2}$, $c_{m_2}$).

The UE may then deterministically select a particular beam index j* (where 1≤j*≤$K_2$) corresponding to a beam $g_j$* in the second frequency band that maximizes the projection of energy along the set of directions corresponding to the beam index i (determined for the first frequency band) for communication in the second frequency band and that is based the certain metric (e.g., RSRP) of the transmit and receive beam pair determined in the first frequency band, thereby taking into account the angle of separation between the first antenna array 502 and the second antenna array 504. That is, the UE determines a transmit and receive beam pair in the second frequency band based on an ideal transmit and receive beam pair determined in the first frequency band, their metrics, and angle of separation between the first antenna array 502 and the second antenna array 504. The deterministic selection is performed without an explicit beam training procedure for the second frequency band.

In an aspect, the UE may determine the ideal beam pair for the second antenna array in accordance with Equation 2, which is provided below.

$$\{j^*, i_1^*\} = \arg \max_{1 \le j \le K_2, 1 \le i_1 \le K_1} \sum_{k\,:\,\theta_k \in \text{ Coverage Region of } f_{i_1}} w_k \left| g_j^H a(\theta_k) \right|^2 + RSRP\left(f_{i_1}, c_{m_1}\right) \quad \text{(Eq. 2)}$$

In accordance with Equation 2, for each candidate beam 704*a*, 704*b*, 704*c*, 704*d*, 704*e*, and 704*f* of the plurality of beams ($K_2$) in the second frequency band, the UE may determine a respective projection of energy of the candidate beam in a coverage region of the beam determined in the first frequency band. For example, suppose the UE determines that the beam $f_{i_1}$ 706 is ideal for the first frequency band via beam training. The UE may determine a respective projection of energy in the coverage region of the beam $f_{i_1}$ 706 for each of the candidate beams 704*a*, 704*b*, 704*c*, 704*d*, 704*e*, and 704*f* of the second frequency band. To determine the respective projection of energy for a particular beam of the candidate beams 704*a*, 704*b*, 704*c*, 704*d*, 704*e*, and 704*f*, the UE may, for each of directions 708*a*, 708*b*, . . . , 708*n* in the coverage region of the beam $f_{i_1}$ 706, determine the conjugate transpose of a beamforming vector representing the candidate beam (i.e., $$g_j^H$$

The UE may combine (e.g., take the dot product of) the conjugate transpose of the beamforming vector with the steering vector associated with a particular direction to generate a respective first combined value. The UE may then apply the respective weight associated with the particular direction ($w_k$) to the respective combined value. The UE may combine (e.g., add) each of the weighted combined values determined for a respective direction of the directions 708*a*, 708*b*, . . . , 708*n*. The resulting value may be the projection of energy of the particular candidate beam in the coverage region of the beam 602. The UE may then combine (e.g., add) the measured metric (e.g., SNR, SINR, RSSI, RSRP, etc.) of the most ideal transmit and receive beam pair determined in the first frequency band (e.g., RSRP ($f_{i_1}$, $c_{m_1}$)) with the determined projection of energy of the particular candidate beam in the coverage region of the beam 706 to generate a second combined value. The UE may perform the foregoing process for each of the candidate beams 704*a*, 704*b*, 704*c*, 704*d*, 704*e*, and 704*f*. The UE may select a candidate beam of the candidate beams 704*a*, 704*b*, 704*c*, 704*d*, 704*e*, and 704*f* having the largest second combined value as the beam index j* for the second frequency band. The UE may also select a transmit beam for the network node 702 that corresponds to the selected candidate beam in the second frequency band. Accordingly, Equation 2 captures the correlation of the beam from the first frequency band to the second frequency band.

It is noted that while the foregoing describes determining a beam in the first frequency band via beam training and deterministically selecting a beam in the second frequency band based on the beam determined in the first frequency band, in other examples, the beam in the second frequency band may be determined via beam training and the beam in the first frequency band may be deterministically selected based on the beam determined in the second frequency band. It is further noted that the foregoing techniques may also be applied to other configurations of a multi-band antenna module, including, but not limited to, the multi-band antenna module 510, as shown in FIG. 5B.

In an aspect, the UE may indicate the presence of a multi-band antenna module, the capability of deterministic beam selection, and/or the supported frequency bands as a beam management capability indicator allowing deterministic beam management at both the UE and the network node (e.g., the network node 702). Based on the beam management capability indicator, the network node may initiate beam training with respect to the first frequency band and not the second frequency band (knowing that the UE is capable of deterministically determining a beam in the second frequency band without beam training for the second frequency band).

The UE may also indicate to the network node 702 to switch to a beam in the second frequency band. For example, the UE may indicate a change in a TCI state (e.g., a TCI state switch) corresponding to the selection of an appropriate beam at the UE in the second frequency band. In the example shown in FIG. 7, the UE may indicate the TCI state to the network node 702 corresponding to beam $c_{m_1*}$ mapped to beam $f_{i_1*}$. The indication of the UE may be based on correlating the selected beam pair at the first frequency band with candidate beam pairs at the second frequency band. In another example, the UE may indicate a change in a CORESET pool index corresponding to the selection of an appropriate beam at the UE in the second frequency band. In a further example, the UE may indicate a change in a quasi-co-location (QCL) type configuration corresponding to the selection of an appropriate beam at the UE in the second frequency band. The indication of the UE may be based on correlating the selected beam pair at the first frequency band with candidate beam pairs at the second frequency band.

In some aspects, different devices (e.g., UEs) may have different deterministic relationships between antenna arrays of distinct frequencies. For example, consider a device, such as a foldable device, where the position of the antenna arrays within the device may vary depending on how the device is folded. In this case, the relationships between the antenna arrays may be stored by the device. That is, the deterministic relationship between a beam index of a first antenna array determined via beam training for a first frequency band and the beam index of a second antenna array for a second frequency band may be stored for each of a plurality of different foldable configurations in which the device may be placed.

The relationships may be represented by a function and/or stored via a data structure (e.g., a lookup table, a hash table, a search index or tree, and/or the like.) maintained by the device. The function and/or data structure may, for each of the plurality of foldable configurations, maintain a deterministic relationship between one or more first beam indexes for a first frequency band and one or more second beam indexes for a second frequency band that are deterministically related to the first beam index (or indexes) (e.g., in accordance with Equation 1 and/or Equation 2). This way, after the device determines a first beam index for a first frequency band via beam training, the device may provide, as an input to the function and/or data structure, an indication indicative of the first beam index and an indication indicative of the foldable configuration in which the device is placed. Based on these indications, the function and/or data structure may determine and output the corresponding second beam index. In some aspects, the relationships may be hard-coded at the device (e.g., by the manufacturer). In other aspects, the UE may generate the function and/or populate the data structure based on the beam training information generated during the beam training procedure for the first frequency band. That is, the UE may generate the function and/or populate the data structure after the device determines the second beam index for the second frequency band for a particular foldable configuration based on the first beam index determined via beam training for the first antenna array in accordance with Equation 1 or Equation 2. This way, the next time the device is placed in that foldable configuration, the device may utilize the function and/or data structure to determine the second beam index for the second frequency band based on the foldable configuration and the first beam index (rather than calculating the second beam index in accordance with Equation 1 or Equation 2). In accordance with the aspects above, compute resources (e.g., processing cycles, memory, storage, power, etc.) of the device may be conserved by limiting the number of times the device calculates the second beam index.

Figure 8:
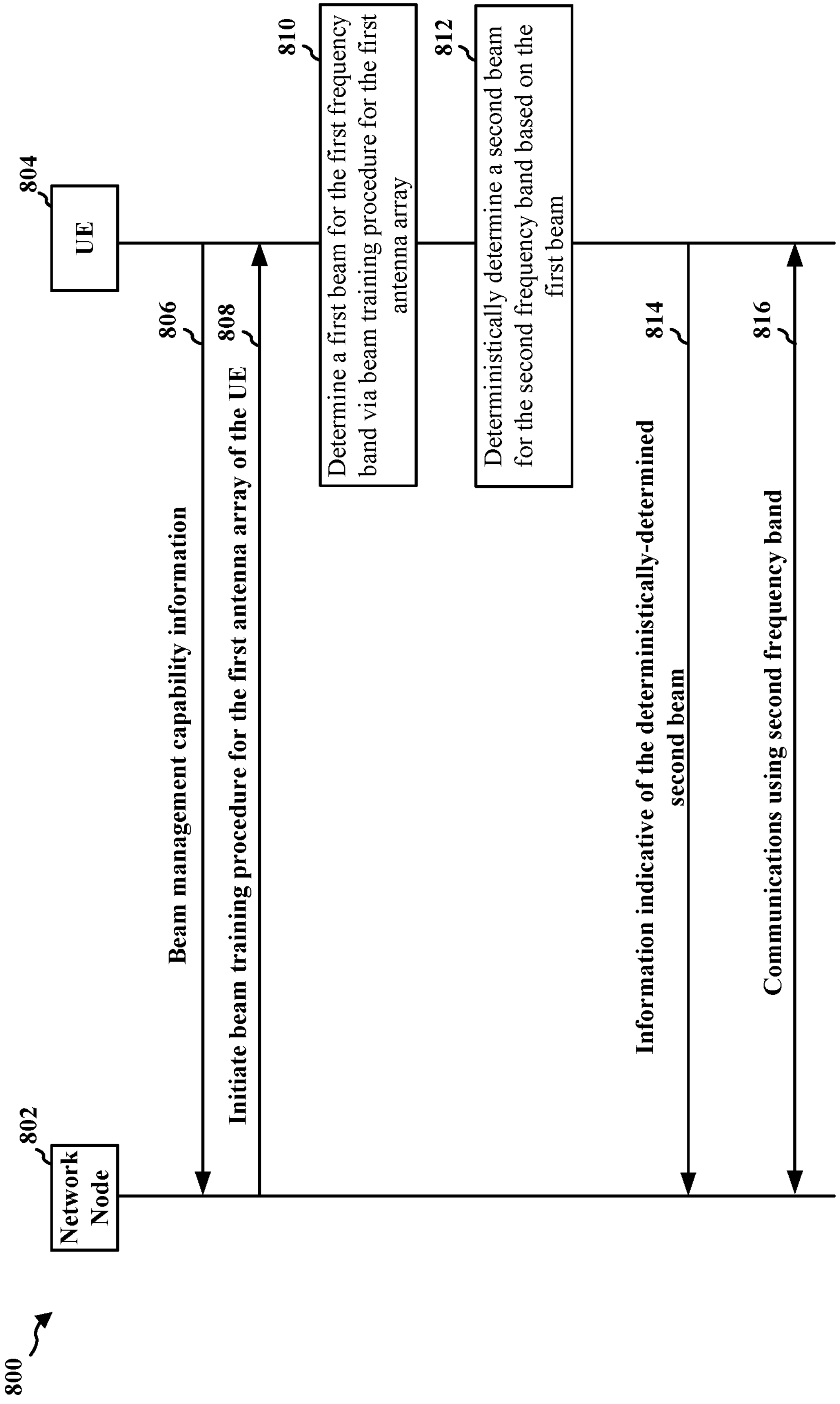
FIG. 8 is a call flow diagram illustrating a method of wireless communication in accordance with various aspects of this present disclosure.

FIG. 8 is a call flow diagram 800 illustrating a method of wireless communication in accordance with various aspects of this present disclosure. As shown in FIG. 8, the diagram 800 includes a network node 802 and a UE 804. The network node 802 may be an example of the base station 402 or the network node 702. Although aspects are described for the network node 802, the aspects may be performed by a network node in aggregation and/or by one or more components of the network node 802 (e.g., such as a CU 110, a DU 130, and/or an RU 140). As shown in FIG. 8, at 806, the UE 804 may provide beam management capability information to the network node 802. The beam management capability information may include information indicative of one or more capabilities of the UE 804 that are associated with beam management. The beam management capability information may include information indicative that the UE 804 includes a multi-band antenna module. For example, the information may indicate that the UE 804 includes a first antenna array including a first plurality of antenna elements configured to support operation on a first frequency band and a second antenna array including a second plurality of antenna elements configured to support operation on a second frequency band.

In some aspects, the first frequency band may correspond to a first frequency range and the second frequency band may correspond to a second frequency range.

In some aspects, the first frequency range and the second frequency range may be non-overlapping.

In some aspects, the first antenna array and the second antenna array have the same boresight direction. In other aspects, the first antenna array has a first boresight direction and the second antenna array has a second boresight direction that is different than the first boresight direction.

In some aspects, the beam management capability information further includes information indicative of the UE 804 supporting the first frequency band and the second frequency band.

At 808, the network node 802 may initiate a beam training procedure for the first antenna array of the UE 804. For example, the network node 802 may transmit reference signal(s) (e.g., CSI-RSs, SSBs, etc.) via one or more transmit beams and one or more receive beams in the first frequency band. The network node 802 may initiate the beam training operation in response to receiving a beam training request from the UE 804 or in response to determining that the channel conditions have degraded (e.g., reached a particular threshold condition).

At 810, the UE 804 may determine a first beam in the first frequency band based on beam training information corresponding to the first frequency band. For example, in some aspects, the UE 804 may perform, based on transmit beam(s) and receive beam(s) in the first frequency band, a beam training procedure corresponding to the first antenna array. The UE 804 may generate the beam training information during the beam training procedure for each transmit beam/receive beam pair (e.g., in a similar manner as described above with reference to FIG. 4). The beam training information may include respective measurement information corresponding to each transmit beam/receive beam pair in the first frequency band. The UE 804 may analyze the respective measurement information generated for each transmit beam/receive beam pair and determine which measurement information is representative of the most ideal (e.g., the most optimal or highest) quality with respect to a particular metric (e.g., SNR, SINR, RSRP, RSSI, etc.). The first beam selected by the UE 804 may include the transmit beam/receive beam pair that is associated with such measurement information.

In some aspects, the UE 804 may transmit information indicative of the determined first beam. For instance, the UE may transmit a beam index corresponding to the determine first beam.

At 812, the UE 804 may deterministically determine (e.g., select) a second beam based on the first beam, the second beam being in the second frequency band.

In some aspects, the UE 804 may deterministically determine the second beam based on the first beam without performance of a beam training procedure corresponding to the second antenna array.

In aspects in which the first antenna array and the second antenna array have the same boresight direction, the UE 804 may deterministically determine the second beam by, determining, for each beam of a plurality of beams supported in the second frequency band, a respective projection of energy in a coverage region of the first beam. The UE 804 may determine a particular beam from the plurality of beams corresponding to a largest projection of energy. The selected beam may be the second beam.

In aspects in which the first antenna array and the second antenna array have the same boresight direction, the UE 804 may determine the respective projection of energy by, for each respective direction of a plurality of directions in the coverage region, combining a respective conjugate transpose of a beamforming vector representing the beam of the plurality of beams with a respective steering vector associated with the respective direction to generate a respective combined value. The UE 804 may then apply a respective weight associated with the respective direction to the respective combined value to generate a respective weighted combined value. The respective projection of energy of the beam in the coverage region of the first beam may be based on the respective weighted combined value generated for each respective direction of the plurality of directions. For example, the respective projection of energy of the particular beam may be determined by adding together the respective weighted combined value generated for each direction of the plurality of directions.

In aspects in which the first antenna array has a first boresight direction and the second antenna array has a second boresight direction that is different than the first boresight direction, the UE 804 may deterministically determine the second beam by, determining, for each beam of a plurality of beams supported in the second frequency band, a respective projection of energy in a coverage region of the first beam. The UE 804 may then combine an RSRP of the first beam with the respective projection of energy to generate a first combined value. The UE 804 may determine a particular beam from the plurality of beams corresponding to a largest first combined value. The particular beam may be the second beam.

In aspects in which the first antenna array has a first boresight direction and the second antenna array has a second boresight direction that is different than the first boresight direction, the UE 804 may determine the respective projection of energy by, for each respective direction of a plurality of directions in the coverage region, combining a respective conjugate transpose of a beamforming vector representing the beam of the plurality of beams with a respective steering vector associated with the respective direction to generate a respective second combined value. The UE 804 may then apply a respective weight associated with the respective direction to the respective second combined value to generate a respective weighted combined value. The respective projection of energy of the beam in the coverage region of the first beam may be based on the respective weighted combined value generated for each respective direction of the plurality of directions. For example, the respective projection of energy of the particular beam may be determined by adding together the respective weighted combined value generated for each direction of the plurality of directions.

In some aspects in which the first antenna array and the second antenna array have the same boresight direction or different boresight directions, each respective weight for each direction of the plurality of directions may be configured independent of signaling from the network node 802. For example, the weights may be hard-coded at the UE 804.

In some aspects in which the first antenna array and the second antenna array have the same boresight direction or different boresight directions the UE 804 may receive, from the network node 802, each respective weight associated with each respective direction of the plurality of directions in the coverage region.

In some aspects, the information indicative of the second beam is based on information indicative of the first beam and information indicative of a configuration of a plurality of configurations of the first antenna array and the second antenna array.

In some aspects, the first antenna array and the second antenna array are configurable (e.g., placeable) into a plurality of different configurations. In accordance with such aspects, the UE 804 may determine the second beam by providing, as an input to a function, information indicative of the first beam and information indicative of a configuration of the plurality of different configurations in which the UE 804 is placed. The UE 804 may obtain, from the function, the information indicative of the second beam (e.g., a beam index of the second beam). To determine the second beam, the UE 804 may determine the second beam based on the information indicative of the second beam.

In some aspects, the function may be configured independent of signaling from the network node 802.

In some aspects, the UE 804 may be configured to generate the function based on the beam training information generated during the beam training procedure for the first frequency band. That is, the UE 804 may generate the function after the UE 804 determines the second beam index for the second frequency band for a particular foldable configuration based on the first beam index determined via beam training for the first antenna array in accordance with Equation 1 or Equation 2.

At 814, the UE 804 may transmit information indicative of the deterministically-determined second beam to the network node 802. For instance, the UE 804 may transmit an identifier associated with the deterministically-determined beam, such as a beam index corresponding to the deterministically-determined beam.

In some aspects, the UE 804 may, in response to determining the second beam based on the first beam, transmit, to the network node 802, information indicative at least one of a change in a TCI state associated with the second beam, a change in a CORESET pool index associated with the second beam, or a change in a QCL type configuration associated with the second beam.

In some aspects, the UE 804 may, in response to determining the second beam based on the first beam, transmit a notification to the network node 802 to switch from a third beam corresponding to the first beam to a fourth beam corresponding to the second beam.

In some aspects, the notification includes information indicative of at least one of a change in a TCI state corresponding to a switch from the third beam to the fourth beam at the network node 802, a change in a CORESET pool index corresponding to the switch from the third beam to the fourth beam at the network node 802, or a change in a QCL type configuration corresponding to the switch from the third beam to the fourth beam at the network node 802. In some aspects, a QCL relationship may indicate a relationship between signals with respect to one or more of: a Doppler shift, a Doppler spread, an average delay, a delay spread, a set of spatial Rx parameters, or the like. In some aspects, the QCL relationship may be based on different QCL type parameter(s). There may be different types of QCL relationships, in which a QCL type A may include the Doppler shift, the Doppler spread, the average delay, and the delay spread; QCL type B may include the Doppler shift and the Doppler spread; QCL type C may include the Doppler shift and the average delay; and QCL type D may include the spatial Rx parameters.

At 816, the network node 802 and the UE 804 may communicate using the second frequency band. For example, the network node 802 and the 804 may transmit and/or receive downlink and/or uplink transmissions, respectively, using the second frequency band.

Figure 9:
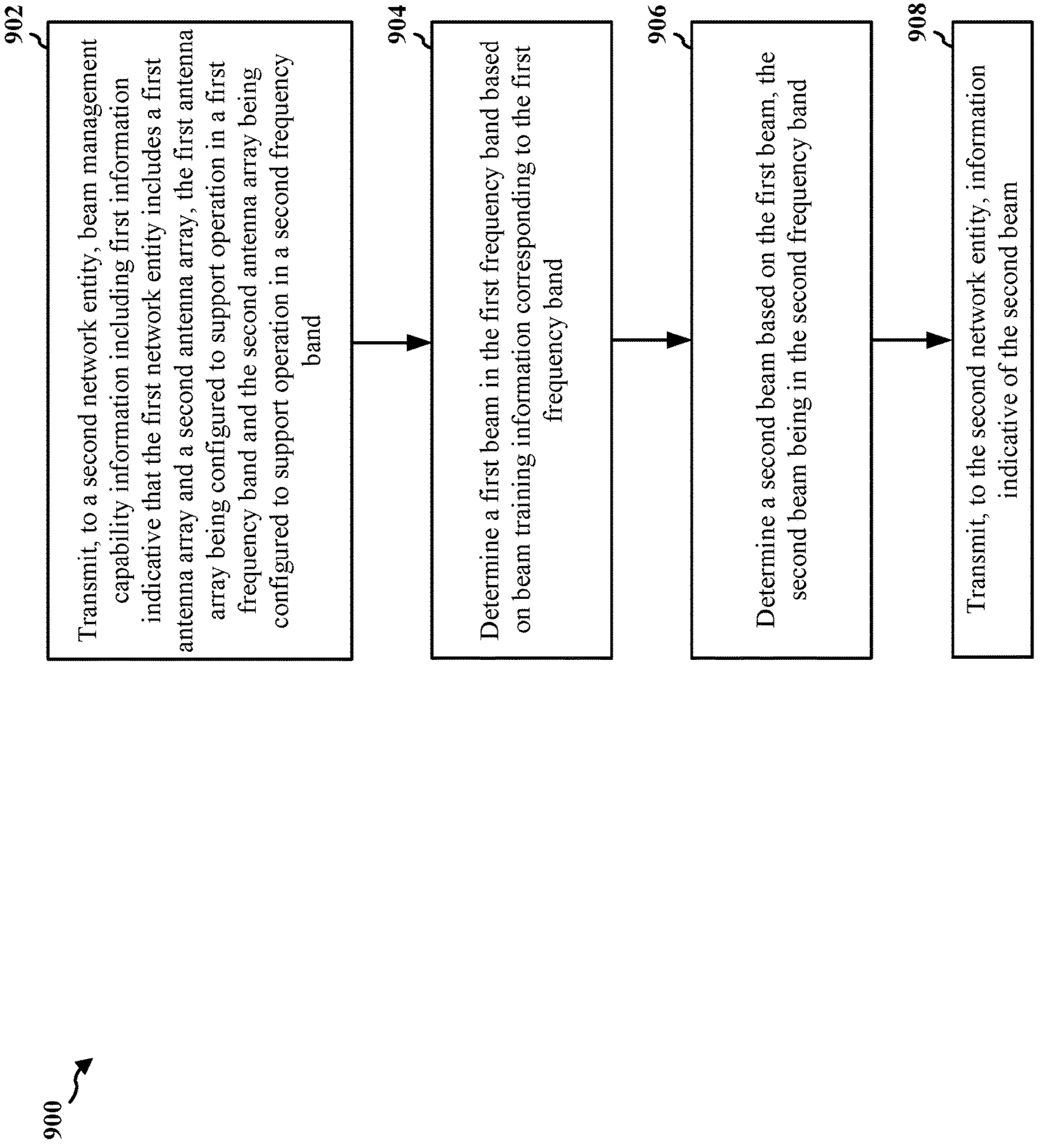
FIG. 9 is a flowchart illustrating methods of wireless communication at a first network entity in accordance with various aspects of the present disclosure.

FIG. 9 is a flowchart 900 illustrating methods of wireless communication at a first network entity in accordance with various aspects of the present disclosure. In some aspects, the first network entity may be a UE. The UE may be the UE 104, 350, 404, 804, or the apparatus 1504 in the hardware implementation of FIG. 15.

At 902, the first network entity may transmit, to a second network entity, beam management capability information including first information indicative that the first network entity includes a first antenna array and a second antenna array, the first antenna array including a first plurality of antenna elements and being configured to support operation in a first frequency band and the second antenna array including a second plurality of antenna elements and being configured to support operation in a second frequency band. For example, referring to FIG. 8, the UE 804, at 806, may transmit, to the network node 802, beam management capability information including first information indicative that the UE 804 includes a first antenna array and a second antenna array, the first antenna array including a first plurality of antenna elements and being configured to support operation in a first frequency band and the second antenna array including a second plurality of antenna elements and being configured to support operation in a second frequency band. In an aspect, 902 may be performed by the beam determination component 198.

In some aspects, the first frequency band may correspond to a first frequency range and the second frequency band may correspond to a second frequency range.

In some aspects, the first frequency range and the second frequency range may be non-overlapping.

In some aspects, the first antenna array and the second antenna array may have the same boresight direction. In other aspects, the first antenna array may have a first boresight direction and the second antenna array may have a second boresight direction that is different than the first boresight direction.

In some aspects, the beam management capability information may further include second information indicative of the first network entity supporting the first frequency band and the second frequency band. For example, referring to FIG. 8, the beam management capability information transmitted by the UE 804 at 806 may further include information indicative of the first network entity supporting the first frequency band and the second frequency band.

At 904, the first network entity may determine a first beam in the first frequency band based on beam training information corresponding to the first frequency band. For example, referring to FIG. 8, the UE 804, at 810, may determine a first beam in the first frequency band based on beam training information corresponding to the first frequency band. In an aspect, 904 may be performed by the beam determination component 198.

In some aspects, the beam training information may include respective measurement information corresponding to each beam of a plurality of beams in the first frequency band, and the plurality of beams may include the first beam. For example, referring to FIG. 8, the beam training information utilized to determine the first beam in the first frequency band at 810 may include respective measurement information corresponding to each beam of a plurality of beams in the first frequency band.

In some aspects, the first network entity may receive, via the first antenna array, a plurality of beams in the first frequency band, the plurality of beams including the first beam. The network entity may perform, based on the plurality of beams, a beam training procedure corresponding to the first antenna array. As part of the beam training procedure, the first network entity may generate the beam training information. For example, as part of the beam training procedure at 808, the UE 804 may receive, via the first antenna array, a plurality of beams in the first frequency band, the plurality of beams including the first beam. The UE 804 may perform, based on the plurality of beams, a beam training procedure corresponding to the first antenna array. As part of the beam training procedure, the UE 804 may generate the beam training information.

At 906, the first network entity may determine a second beam based on the first beam, the second beam being in the second frequency band. For example, referring to FIG. 8, the UE 804, at 812, may determine a second beam based on the first beam, the second beam being in the second frequency band. In an aspect, 906 may be performed by the beam determination component 198.

In some aspects, the first network entity may determine the second beam based on the first beam without performance of a beam training procedure corresponding to the second array. For example, referring to FIG. 8, the UE 804, at 812, may determine the second beam based on the first beam without performance of a beam training procedure corresponding to the second array.

In aspects in which the first antenna array and the second antenna array have the same boresight direction, the first network entity may determine the second beam based on the first beam by, determining, for each beam of a plurality of beams supported in the second frequency band, a respective projection of energy in a coverage region of the first beam. The first network entity may determine a particular beam from the plurality of beams corresponding to a largest projection of energy. The particular beam may be the second beam. For example, referring to FIG. 8, the UE 804, at 812, may determine the second beam based on the first beam by, determining, for each beam of a plurality of beams supported in the second frequency band, a respective projection of energy in a coverage region of the first beam. The UE 804 may determine a particular beam from the plurality of beams corresponding to a largest projection of energy. The particular beam may be the second beam.

In aspects in which the first antenna array and the second antenna array have the same boresight direction, the first network entity may determine the respective projection of energy by, for each respective direction of a plurality of directions in the coverage region, combining a respective conjugate transpose of a beamforming vector representing the beam of the plurality of beams with a respective steering vector associated with the respective direction to generate a respective combined value. The first network entity may then apply a respective weight associated with the respective direction to the respective combined value to generate a respective weighted combined value. The respective projection of energy of the beam in the coverage region of the first beam may be based on the respective weighted combined value generated for each respective direction of the plurality of directions. For example, the respective projection of energy of a particular beam may be determined by adding together the respective weighted combined value generated for each direction of the plurality of directions. For example, referring to FIG. 8, the UE 804, at 812, may determine the respective projection of energy by, for each respective direction of a plurality of directions in the coverage region, combining a respective conjugate transpose of a beamforming vector representing the beam of the plurality of beams with a respective steering vector associated with the respective direction to generate a respective combined value. The UE 804 may then apply a respective weight associated with the respective direction to the respective combined value to generate a respective weighted combined value. The respective projection of energy of the beam in the coverage region of the first beam may be based on the respective weighted combined value generated for each respective direction of the plurality of directions. For example, the respective projection of energy of a particular beam may be determined by adding together the respective weighted combined value generated for each direction of the plurality of directions.

In some aspects, each respective weight may be configured independent of signaling from the second network entity. For example, with reference to FIG. 8, each respective weight associated applied at 812 may be configured independent of signaling from the network node 802.

In some aspects, the first network entity may receive, from the second network entity, each respective weight associated with each respective direction of the plurality of directions in the coverage region. For example, with reference to FIG. 8, the UE 804 may receive, from the network node 802, each respective weight associated with each respective direction of the plurality of directions in the coverage region.

In aspects in which the first antenna array has a first boresight direction and the second antenna array has a second boresight direction that is different than the first boresight direction, the first network entity may determine the second beam based on the first beam by, determining, for each beam of a plurality of beams supported in the second frequency band, a respective projection of energy in a coverage region of the first beam. The first network entity may then combine an RSRP of the first beam with the respective projection of energy to generate a first combined value. The first network entity may determine a particular beam from the plurality of beams corresponding to a largest first combined value. The particular beam may be the second beam. For example, referring to FIG. 8, the UE 804, at 812, may determine the second beam based on the first beam by, determining, for each beam of a plurality of beams supported in the second frequency band, a respective projection of energy in a coverage region of the first beam. The UE 804 may then combine an RSRP of the first beam with the respective projection of energy to generate a first combined value. The UE 804 may determine a particular beam from the plurality of beams corresponding to a largest first combined value.

In aspects in which the first antenna array has a first boresight direction and the second antenna array has a second boresight direction that is different than the first boresight direction, the first network entity may determine the respective projection of energy by, for each respective direction of a plurality of directions in the coverage region, combining a respective conjugate transpose of a beamforming vector representing the beam of the plurality of beams with a respective steering vector associated the respective direction to generate a respective second combined value. The first network entity may then apply a respective weight associated with the respective direction to the respective second combined value to generate a respective weighted combined value. The respective projection of energy of the beam in the coverage region of the first beam may be based on the respective weighted combined value generated for each respective direction of the plurality of directions. For example, the respective projection of energy of a particular beam may be determined by adding together the respective weighted combined value generated for each direction of the plurality of directions. For example, referring to FIG. 8, the UE 804, at 812, may determine the respective projection of energy by, for each respective direction of a plurality of directions in the coverage region, combining a respective conjugate transpose of a beamforming vector representing the beam of the plurality of beams with a respective steering vector associated the respective direction to generate a respective second combined value. The UE 804 may then apply a respective weight associated with the respective direction to the respective second combined value to generate a respective weighted combined value. The respective projection of energy of the beam in the coverage region of the first beam may be based on the respective weighted combined value generated for each respective direction of the plurality of directions.

In some aspects, each respective weight may be configured independent of signaling from the second network entity. For example, referring to FIG. 8, each respective weight associated applied at 812 may be configured independent of signaling from the network node 802.

In some aspects, the first network entity may receive, from the second network entity, each respective weight associated with each respective direction of the plurality of directions in the coverage region. For example, referring to FIG. 8, the UE 804 may receive, from the network node 802, each respective weight associated with each respective direction of the plurality of directions in the coverage region.

In some aspects, the information indicative of the second beam may be based on information indicative of the first beam and information indicative of a configuration of a plurality of configurations of the first antenna array and the second antenna array. For example, referring to FIG. 8, the information indication of the second beam transmitted at 814 by the UE 804 may be based on information indicative of the first beam and information indicative of a configuration of a plurality of configurations of the first antenna array and the second antenna array.

In some aspects, the first antenna array and the second antenna array are configurable into a plurality of configurations. In accordance with such aspects, the first network entity may input, into a function, information indicative of the first beam and information indicative of a configuration of the plurality of configurations. The first network entity may obtain, from the function, the information indicative of the second beam. The first network entity may determine the second beam based on the information indicative of the second beam. For example, referring to FIG. 8, the UE 804 may, at 812, may input, into a function, information indicative of the first beam and information indicative of a configuration of the plurality of configurations. The UE 804 may obtain, from the function, the information indicative of the second beam. The UE 804, at 812, may determine the second beam based on the information indicative of the second beam.

In some aspects, the function may be configured independent of signaling from the second network entity. For example, referring to FIG. 8, the function may be configured independent of signaling from the network node 802.

In some aspects, the first network entity may be configured to generate the function based on the beam training information. For example, referring to FIG. 8, the UE 804 may be configured to generate the function based on the beam training information. For example, the UE 804 may be configured to generate the function based on the beam training information generated during the beam training procedure for the first frequency band. That is, the UE 804 may generate the function after the UE 804 determines the second beam index for the second frequency band for a particular foldable configuration at 812 based on the first beam index determined at 810 for the first antenna array in accordance with Equation 1 or Equation 2.

At 908, the first network entity may transmit, to the second network entity, information indicative of the second beam. For example, referring to FIG. 8, the UE 804, at 814, may transmit, to the network node 802, information indicative of the second beam. For example, the UE 804 may indicate to the network node 802 a beam index of the second beam. In an aspect, 908 may be performed by the beam determination component 198.

In some aspects, the first network entity may transmit, to the second entity, information indicative of at least one of a change in a TCI state associated with the second beam, a change in CORESET pool index associated with the second beam, or a change in a QCL type configuration associated with the second beam. For example, referring to FIG. 8, the UE 804 may, in response to determining the second beam based on the first beam at 812, transmit, to the network node 802, information indicative of at least one of a change in a TCI state associated with the second beam, a change in CORESET pool index associated with the second beam, or a change in a QCL type configuration associated with the second beam. The indication may be transmitted at 814.

In some aspects, the first network entity may, in response to determining the second beam based on the first beam, transmit a notification to the second network entity to switch from a third beam corresponding to the first beam to a fourth beam corresponding to the second beam. For example, referring to FIG. 8, the UE 804 may, in response to determining the second beam based on the first beam, transmit a notification to the network node 802 to switch from a third beam corresponding to the first beam to a fourth beam corresponding to the second beam. The indication may be transmitted at 814.

In some aspects, the notification includes information indicative of at least one of a change in a TCI state corresponding to a switch from the third beam to the fourth beam at the second network entity, a change in a CORESET pool index corresponding to the switch from the third beam to the fourth beam at the second network entity, or a change in a QCL type configuration corresponding to the switch from the third beam to the fourth beam at the second network entity. For example, referring to FIG. 8, the notification (e.g., transmitted at 814) may include information indicative of at least one of a change in a TCI state corresponding to a switch from the third beam to the fourth beam at the network node 802, a change in a CORESET pool index corresponding to the switch from the third beam to the fourth beam at the network node 802, or a change in a QCL type configuration corresponding to the switch from the third beam to the fourth beam at the network node 802.

Figure 10:
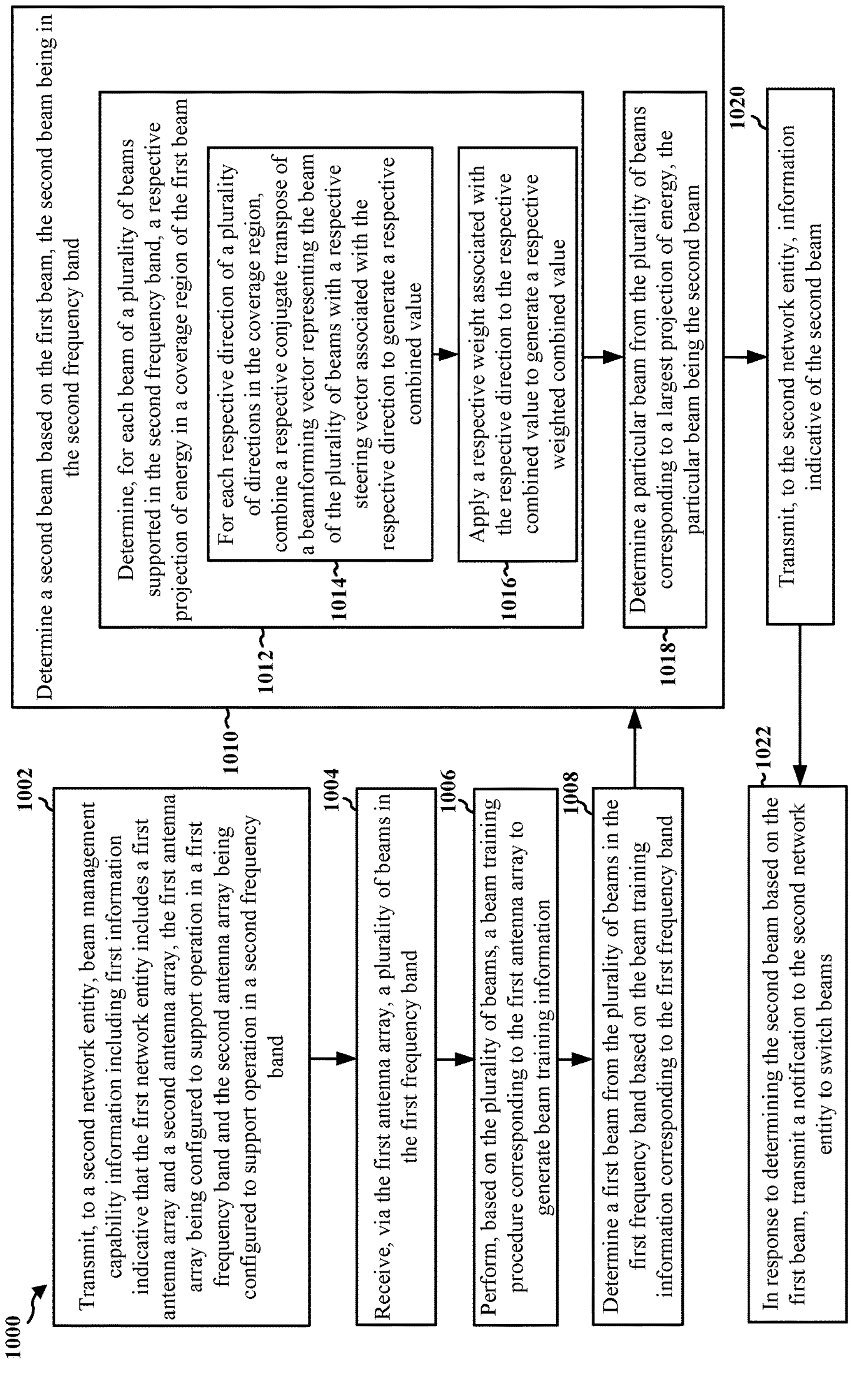
FIG. 10 is a flowchart illustrating methods of wireless communication at a first network entity in accordance with various aspects of the present disclosure.

FIG. 10 is a flowchart 1000 illustrating methods of wireless communication at a first network entity including a first antenna array and a second antenna array that have the same boresight direction. In some aspects, the first network entity may be a UE. The UE may be the UE 104, 350, 404, 804, or the apparatus 1504 in the hardware implementation of FIG. 15.

At 1002, the first network entity may transmit, to a second network entity, beam management capability information including first information indicative that the first network entity includes a first antenna array and a second antenna array, the first antenna array including a first plurality of antenna elements and being configured to support operation in a first frequency band and the second antenna array including a second plurality of antenna elements and being configured to support operation in a second frequency band. For example, referring to FIG. 8, the UE 804, at 806, may transmit, to the network node 802, beam management capability information including first information indicative that the UE 804 includes a first antenna array and a second antenna array, the first antenna array including a first plurality of antenna elements and being configured to support operation in a first frequency band and the second antenna array including a second plurality of antenna elements and being configured to support operation in a second frequency band.

In some aspects, the first frequency band may correspond to a first frequency range and the second frequency band may correspond to a second frequency range.

In some aspects, the first frequency range and the second frequency range may be non-overlapping.

In some aspects, the beam management capability information may further include second information indicative of the first network entity supporting the first frequency band and the second frequency band. For example, referring to FIG. 8, the beam management capability information transmitted by the UE 804 at 806 may further include information indicative of the first network entity supporting the first frequency band and the second frequency band.

At 1004, the first network entity may receive, via the first antenna array, a plurality of beams in the first frequency band. For example, as part of the beam training procedure at 808, the UE 804 may receive, via the first antenna array, a plurality of beams in the first frequency band.

At 1006, the first network entity may perform, based on the plurality of beams, a beam training procedure corresponding to the first antenna array. As part of the beam training procedure, the first network entity may generate beam training information. For example, referring to FIG. 8, the UE 804 may perform, based on the plurality of beams, a beam training procedure corresponding to the first antenna array. As part of the beam training procedure, the UE 804 may generate the beam training information.

In some aspects, the beam training information may include respective measurement information corresponding to each beam of a plurality of beams in the first frequency band. For example, referring to FIG. 8, the beam training information may include respective measurement information corresponding to each beam of a plurality of beams in the first frequency band.

At 1008, the first network entity may determine a first beam from the plurality of beams in the first frequency band based on the beam training information corresponding to the first frequency band. For example, referring to FIG. 8, the UE 804, at 810, may determine a first beam from the plurality of beams in the first frequency band based on the beam training information corresponding to the first frequency band.

At 1010, the first network entity may determine a second beam based on the first beam, the second beam being in the second frequency band. For example, referring to FIG. 8, the UE 804, at 812, may determine a second beam based on the first beam, the second beam being in the second frequency band.

In some aspects, the first network entity may determine the second beam based on the first beam without performance of a beam training procedure corresponding to the second array. For example, referring to FIG. 8, the UE 804, at 812, may determine the second beam based on the first beam without performance of a beam training procedure corresponding to the second array.

In some aspects, as part of 1010, at 1012, the first network entity may determine the second beam based on the first beam by, determining, for each beam of a plurality of beams supported in the second frequency band, a respective projection of energy in a coverage region of the first beam. For example, referring to FIG. 8, the UE 804, at 812, may determine the second beam based on the first beam by, determining, for each beam of a plurality of beams supported in the second frequency band, a respective projection of energy in a coverage region of the first beam.

In some aspects, as part of 1012, at 1014, the first network entity may determine the respective projection of energy by, for each respective direction of a plurality of directions in the coverage region, combining a respective conjugate transpose of a beamforming vector representing the beam of the plurality of beams with a respective steering vector associated with the respective direction to generate a respective combined value. For example, referring to FIG. 8, the UE 804, at 812, may determine the respective projection of energy by, for each respective direction of a plurality of directions in the coverage region, combining a respective conjugate transpose of a beamforming vector representing the beam of the plurality of beams with a respective steering vector associated with the respective direction to generate a respective combined value.

In some aspects, as part of 1012, at 1016, the first network entity may apply a respective weight associated with the respective direction to the respective combined value to generate a respective weighted combined value. The respective projection of energy of the beam in the coverage region of the first beam may be based on the respective weighted combined value generated for each respective direction of the plurality of directions. For example, the respective projection of energy of a particular beam may be determined by adding together the respective weighted combined value generated for each direction of the plurality of directions.

For example, referring to FIG. 8, the UE 804 may apply a respective weight associated with the respective direction to the respective combined value to generate a respective weighted combined value. The respective projection of energy of the beam in the coverage region of the first beam may be based on the respective weighted combined value generated for each respective direction of the plurality of directions. For example, the respective projection of energy of a particular beam may be determined by adding together the respective weighted combined value generated for each direction of the plurality of directions.

In some aspects, each respective weight may be configured independent of signaling from the second network entity. For example, with reference to FIG. 8, each respective weight associated applied at 812 may be configured independent of signaling from the network node 802.

In some aspects, the first network entity may receive, from the second network entity, each respective weight associated with each respective direction of the plurality of directions in the coverage region. For example, with reference to FIG. 8, the UE 804 may receive, from the network node 802, each respective weight associated with each respective direction of the plurality of directions in the coverage region.

In some aspects, as part of 1010, at 1018, the first network entity may determine a particular beam from the plurality of beams corresponding to a largest projection of energy. The particular beam may be the second beam. For example, referring to FIG. 8, the UE 804 may determine a particular beam from the plurality of beams corresponding to a largest projection of energy. The particular beam may be the second beam.

At 1020, the first network entity may transmit, to the second network entity, information indicative of the second beam. For example, referring to FIG. 8, the UE 804, at 814, may transmit, to the network node 802, information indicative of the second beam. For example, the UE 804 may indicate to the network node 802 a beam index of the second beam.

In some aspects, at 1022, the first network entity may, in response to determining the second beam based on the first beam, transmit a notification to the second network entity to switch beams. For example, referring to FIG. 8, the UE 804 may, in response to determining the second beam based on the first beam at 812, transmit a notification to the network node 802 to switch beams. The indication may be transmitted at 814.

In some aspects, the first network entity may transmit, to the second entity, information indicative of at least one of a change in a TCI state associated with the second beam, a change in CORESET pool index associated with the second beam, or a change in a QCL type configuration associated with the second beam. For example, referring to FIG. 8, the UE 804 may, in response to determining the second beam based on the first beam at 812, transmit, to the network node 802, information indicative of at least one of a change in a TCI state associated with the second beam, a change in CORESET pool index associated with the second beam, or a change in a QCL type configuration associated with the second beam. The indication may be transmitted at 814, for example, via the notification.

In some aspects, the first network entity may, in response to determining the second beam based on the first beam, transmit a notification to the second network entity to switch from a third beam corresponding to the first beam to a fourth beam corresponding to the second beam. For example, referring to FIG. 8, the UE 804 may, in response to determining the second beam based on the first beam, transmit a notification to the network node 802 to switch from a third beam corresponding to the first beam to a fourth beam corresponding to the second beam. The indication may be transmitted at 814.

In some aspects, the notification includes information indicative of at least one of a change in a TCI state corresponding to a switch from the third beam to the fourth beam at the second network entity, a change in a CORESET pool index corresponding to the switch from the third beam to the fourth beam at the second network entity, or a change in a QCL type configuration corresponding to the switch from the third beam to the fourth beam at the second network entity. For example, referring to FIG. 8, the notification (e.g., transmitted at 814) may include information indicative of at least one of a change in a TCI state corresponding to a switch from the third beam to the fourth beam at the network node 802, a change in a CORESET pool index corresponding to the switch from the third beam to the fourth beam at the network node 802, or a change in a QCL type configuration corresponding to the switch from the third beam to the fourth beam at the network node 802.

Figure 11:
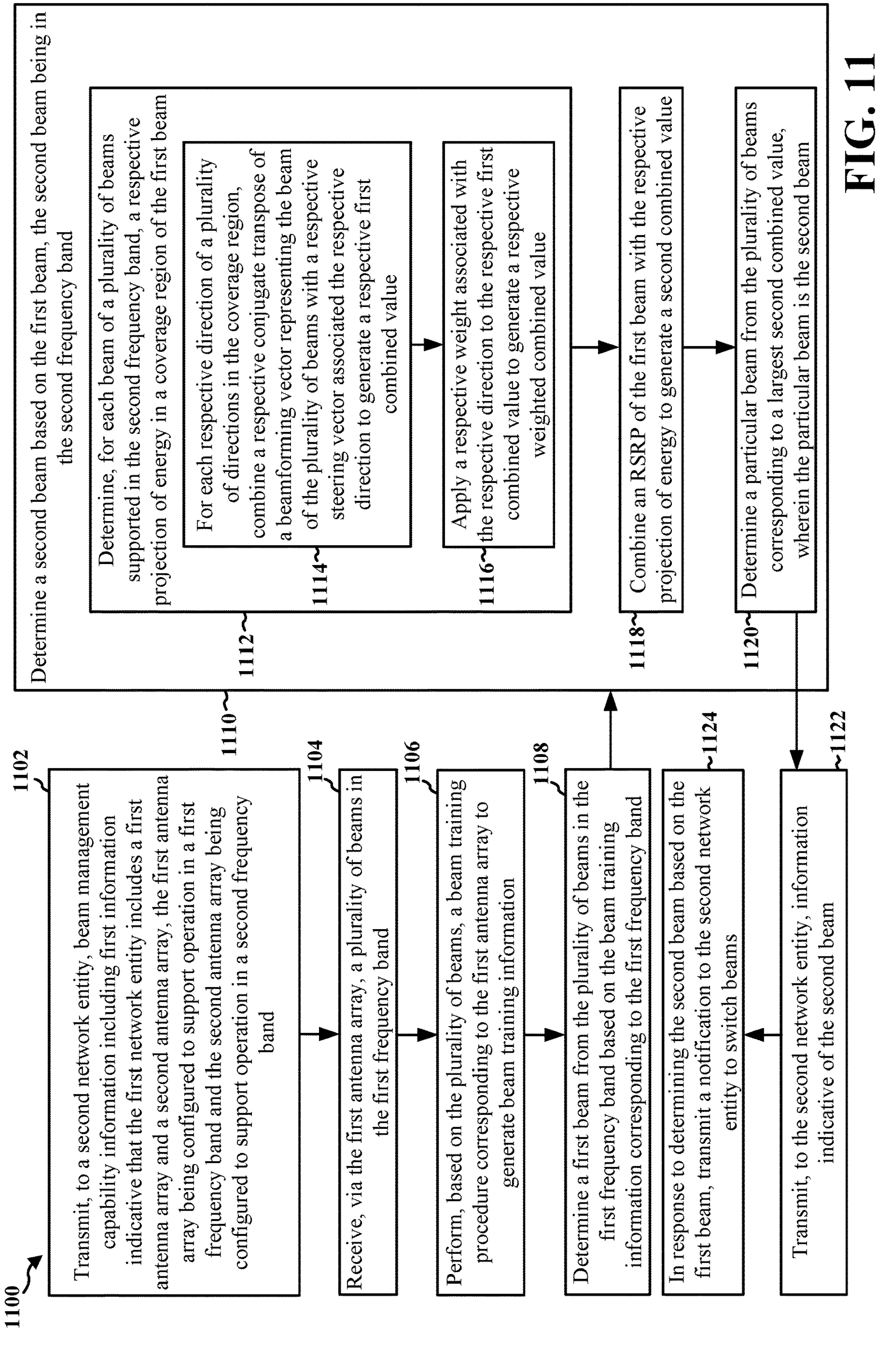
FIG. 11 is a flowchart illustrating methods of wireless communication at a first network entity in accordance with various aspects of the present disclosure.

FIG. 11 is a flowchart 1100 illustrating methods of wireless communication at a first network entity including a first antenna array and a second antenna array that have the different boresight directions. In some aspects, the first network entity may be a UE. The UE may be the UE 104, 350, 404, 804, or the apparatus 1504 in the hardware implementation of FIG. 15.

At 1102, the first network entity may transmit, to a second network entity, beam management capability information including first information indicative that the first network entity includes a first antenna array and a second antenna array, the first antenna array including a first plurality of antenna elements and being configured to support operation in a first frequency band and the second antenna array including a second plurality of antenna elements and being configured to support operation in a second frequency band. For example, referring to FIG. 8, the UE 804, at 806, may transmit, to the network node 802, beam management capability information including first information indicative that the UE 804 includes a first antenna array and a second antenna array, the first antenna array including a first plurality of antenna elements and being configured to support operation in a first frequency band and the second antenna array including a second plurality of antenna elements and being configured to support operation in a second frequency band.

In some aspects, the first frequency band may correspond to a first frequency range and the second frequency band may correspond to a second frequency range.

In some aspects, the first frequency range and the second frequency range may be non-overlapping.

In some aspects, the beam management capability information may further include second information indicative of the first network entity supporting the first frequency band and the second frequency band. For example, referring to FIG. 8, the beam management capability information transmitted by the UE 804 at 806 may further include information indicative of the first network entity supporting the first frequency band and the second frequency band.

At 1104, the first network entity may receive, via the first antenna array, a plurality of beams in the first frequency band. For example, as part of the beam training procedure at 808, the UE 804 may receive, via the first antenna array, a plurality of beams in the first frequency band.

At 1106, the first network entity may perform, based on the plurality of beams, a beam training procedure corresponding to the first antenna array. As part of the beam training procedure, the first network entity may generate beam training information. For example, referring to FIG. 8, the UE 804 may perform, based on the plurality of beams, a beam training procedure corresponding to the first antenna array. As part of the beam training procedure, the UE 804 may generate the beam training information.

In some aspects, the beam training information may include respective measurement information corresponding to each beam of a plurality of beams in the first frequency band. For example, referring to FIG. 8, the beam training information may include respective measurement information corresponding to each beam of a plurality of beams in the first frequency band.

At 1108, the first network entity may determine a first beam from the plurality of beams in the first frequency band based on the beam training information corresponding to the first frequency band. For example, referring to FIG. 8, the UE 804, at 810, may determine a first beam from the plurality of beams in the first frequency band based on the beam training information corresponding to the first frequency band.

At 1110, the first network entity may determine a second beam based on the first beam, the second beam being in the second frequency band. For example, referring to FIG. 8, the UE 804, at 812, may determine a second beam based on the first beam, the second beam being in the second frequency band.

In some aspects, the first network entity may determine the second beam based on the first beam without performance of a beam training procedure corresponding to the second array. For example, referring to FIG. 8, the UE 804, at 812, may determine the second beam based on the first beam without performance of a beam training procedure corresponding to the second array.

In some aspects, as part of 1110, at 1112, the first network entity may determine the second beam based on the first beam by, determining, for each beam of a plurality of beams supported in the second frequency band, a respective projection of energy in a coverage region of the first beam. For example, referring to FIG. 8, the UE 804, at 812, may determine the second beam based on the first beam by, determining, for each beam of a plurality of beams supported in the second frequency band, a respective projection of energy in a coverage region of the first beam.

In some aspects, as part of 1112, at 1114, the first network entity may determine the respective projection of energy by, for each respective direction of a plurality of directions in the coverage region, combining a respective conjugate transpose of a beamforming vector representing the beam of the plurality of beams with a respective steering vector associated with the respective direction to generate a respective first combined value. For example, referring to FIG. 8, the UE 804, at 812, may determine the respective projection of energy by, for each respective direction of a plurality of directions in the coverage region, combining a respective conjugate transpose of a beamforming vector representing the beam of the plurality of beams with a respective steering vector associated with the respective direction to generate a respective first combined value.

In some aspects, as part of 1112, at 1116, the first network entity may apply a respective weight associated with the respective direction to the respective first combined value to generate a respective weighted combined value. The respective projection of energy of the beam in the coverage region of the first beam may be based on the respective weighted combined value generated for each respective direction of the plurality of directions. For example, the respective projection of energy of a particular beam may be determined by adding together the respective weighted combined value generated for each direction of the plurality of directions. For example, referring to FIG. 8, the UE 804 may apply a respective weight associated with the respective direction to the respective first combined value to generate a respective weighted combined value. The respective projection of energy of the beam in the coverage region of the first beam may be based on the respective weighted combined value generated for each respective direction of the plurality of directions. For example, the respective projection of energy of a particular beam may be determined by adding together the respective weighted combined value generated for each direction of the plurality of directions.

In some aspects, each respective weight may be configured independent of signaling from the second network entity. For example, with reference to FIG. 8, each respective weight associated applied at 812 may be configured independent of signaling from the network node 802.

In some aspects, the first network entity may receive, from the second network entity, each respective weight associated with each respective direction of the plurality of directions in the coverage region. For example, with reference to FIG. 8, the UE 804 may receive, from the network node 802, each respective weight associated with each respective direction of the plurality of directions in the coverage region.

In some aspects, as part of 1110, at 1118, the first network entity may combine an RSRP of the first beam with the respective projection of energy to generate a second combined value. For example, referring to FIG. 8, the UE 804 may combine an RSRP of the first beam with the respective projection of energy to generate a second combined value.

In some aspects, as part of 1110, at 1120, the first network entity may determine a particular beam from the plurality of beams corresponding to a largest second combined value. The particular beam may be the second beam. For example, referring to FIG. 8, the UE 804 may determine a particular beam from the plurality of beams corresponding to a largest second combined value. The particular beam may be the second beam.

At 1122, the first network entity may transmit, to the second network entity, information indicative of the second beam. For example, referring to FIG. 8, the UE 804, at 814, may transmit, to the network node 802, information indicative of the second beam. For example, the UE 804 may indicate to the network node 802 a beam index of the second beam.

In some aspects, at 1124, the first network entity may, in response to determining the second beam based on the first beam, transmit a notification to the second network entity to switch beams. For example, referring to FIG. 8, the UE 804 may, in response to determining the second beam based on the first beam at 812, transmit a notification to the network node 802 to switch beams. The indication may be transmitted at 814.

In some aspects, the first network entity may transmit, to the second entity, information indicative of at least one of a change in a TCI state associated with the second beam, a change in CORESET pool index associated with the second beam, or a change in a QCL type configuration associated with the second beam. For example, referring to FIG. 8, the UE 804 may, in response to determining the second beam based on the first beam at 812, transmit, to the network node

802, information indicative of at least one of a change in a TCI state associated with the second beam, a change in CORESET pool index associated with the second beam, or a change in a QCL type configuration associated with the second beam. The indication may be transmitted at 814, for example, via the notification.

In some aspects, the first network entity may, in response to determining the second beam based on the first beam, transmit a notification to the second network entity to switch from a third beam corresponding to the first beam to a fourth beam corresponding to the second beam. For example, referring to FIG. 8, the UE 804 may, in response to determining the second beam based on the first beam, transmit a notification to the network node 802 to switch from a third beam corresponding to the first beam to a fourth beam corresponding to the second beam. The indication may be transmitted at 814.

In some aspects, the notification includes information indicative of at least one of a change in a TCI state corresponding to a switch from the third beam to the fourth beam at the second network entity, a change in a CORESET pool index corresponding to the switch from the third beam to the fourth beam at the second network entity, or a change in a QCL type configuration corresponding to the switch from the third beam to the fourth beam at the second network entity. For example, referring to FIG. 8, the notification (e.g., transmitted at 814) may include information indicative of at least one of a change in a TCI state corresponding to a switch from the third beam to the fourth beam at the network node 802, a change in a CORESET pool index corresponding to the switch from the third beam to the fourth beam at the network node 802, or a change in a QCL type configuration corresponding to the switch from the third beam to the fourth beam at the network node 802.

Figure 12:
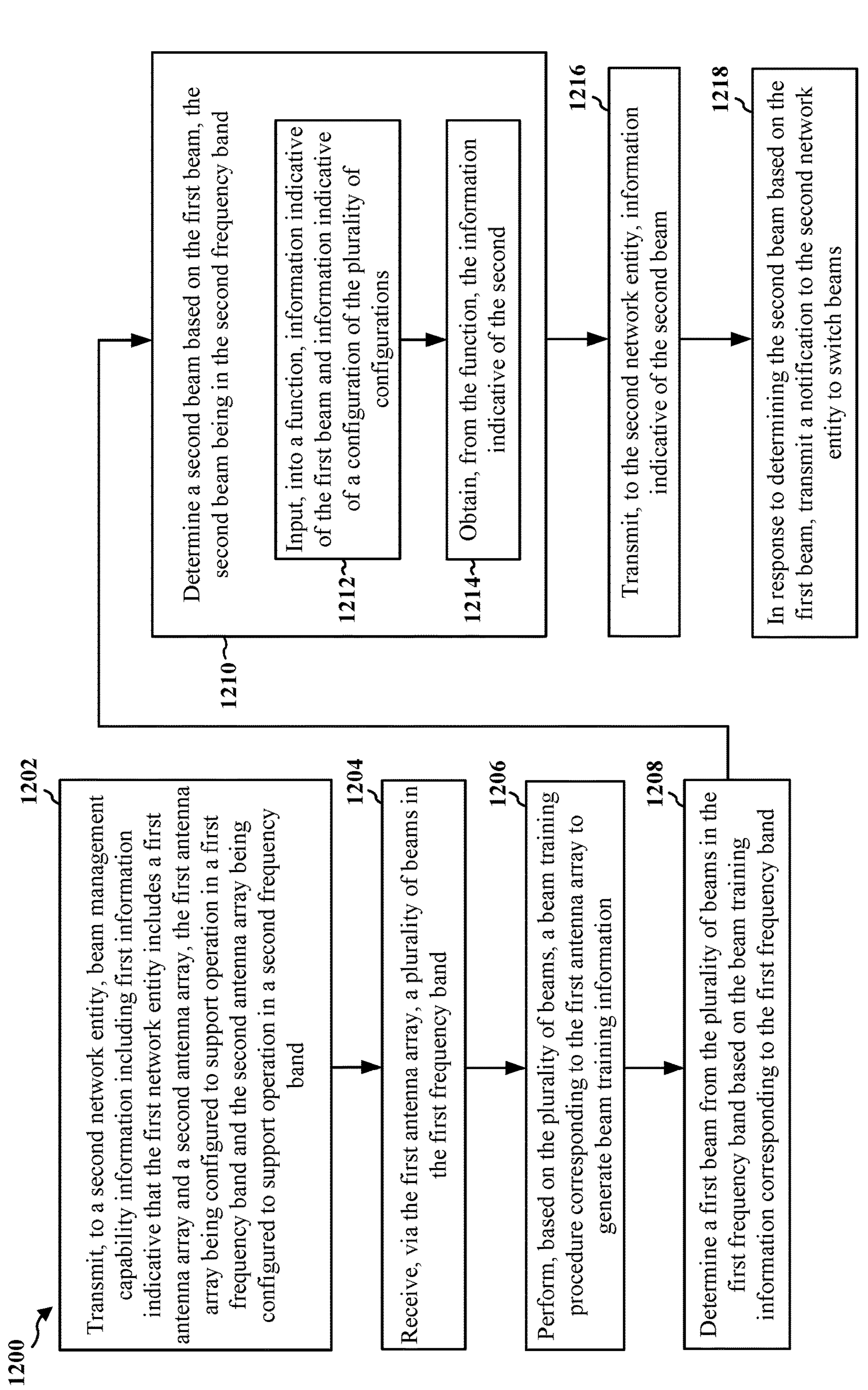
FIG. 12 is a flowchart illustrating methods of wireless communication at a first network entity in accordance with various aspects of the present disclosure.

FIG. 12 is a flowchart 1200 illustrating methods of wireless communication at a first network entity including a first antenna array and a second antenna array that are configurable into a plurality of configurations. In some aspects, the first network entity may be a UE. The UE may be the UE 104, 350, 404, 804, or the apparatus 1504 in the hardware implementation of FIG. 15.

At 1202, the first network entity may transmit, to a second network entity, beam management capability information including first information indicative that the first network entity includes a first antenna array and a second antenna array, the first antenna array including a first plurality of antenna elements and being configured to support operation in a first frequency band and the second antenna array including a second plurality of antenna elements and being configured to support operation in a second frequency band. For example, referring to FIG. 8, the UE 804, at 806, may transmit, to the network node 802, beam management capability information including first information indicative that the UE 804 includes a first antenna array and a second antenna array, the first antenna array including a first plurality of antenna elements and being configured to support operation in a first frequency band and the second antenna array including a second plurality of antenna elements and being configured to support operation in a second frequency band.

In some aspects, the first frequency band may correspond to a first frequency range and the second frequency band may correspond to a second frequency range.

In some aspects, the first frequency range and the second frequency range may be non-overlapping.

In some aspects, the beam management capability information may further include second information indicative of the first network entity supporting the first frequency band and the second frequency band. For example, referring to FIG. 8, the beam management capability information transmitted by the UE 804 at 806 may further include information indicative of the first network entity supporting the first frequency band and the second frequency band.

At 1204, the first network entity may receive, via the first antenna array, a plurality of beams in the first frequency band. For example, as part of the beam training procedure at 808, the UE 804 may receive, via the first antenna array, a plurality of beams in the first frequency band.

At 1206, the first network entity may perform, based on the plurality of beams, a beam training procedure corresponding to the first antenna array. As part of the beam training procedure, the first network entity may generate beam training information. For example, referring to FIG. 8, the UE 804 may perform, based on the plurality of beams, a beam training procedure corresponding to the first antenna array. As part of the beam training procedure, the UE 804 may generate the beam training information.

In some aspects, the beam training information may include respective measurement information corresponding to each beam of a plurality of beams in the first frequency band. For example, referring to FIG. 8, the beam training information may include respective measurement information corresponding to each beam of a plurality of beams in the first frequency band.

At 1208, the first network entity may determine a first beam from the plurality of beams in the first frequency band based on the beam training information corresponding to the first frequency band. For example, referring to FIG. 8, the UE 804, at 810, may determine a first beam from the plurality of beams in the first frequency band based on the beam training information corresponding to the first frequency band.

At 1210, the first network entity may determine a second beam based on the first beam, the second beam being in the second frequency band. For example, referring to FIG. 8, the UE 804, at 812, may determine a second beam based on the first beam, the second beam being in the second frequency band.

In some aspects, the first network entity may determine the second beam based on the first beam without performance of a beam training procedure corresponding to the second array. For example, referring to FIG. 8, the UE 804, at 812, may determine the second beam based on the first beam without performance of a beam training procedure corresponding to the second array.

In some aspects, as part of 1210, at 1212, the first network entity may input, into a function, information indicative of the first beam and information indicative of a configuration of the plurality of configurations. For example, referring to FIG. 8, the UE 804 may, at 812, may input, into a function, information indicative of the first beam and information indicative of a configuration of the plurality of configurations In some aspects, as part of 1210, at 1214, the first network entity may obtain, from the function, the information indicative of the second beam. The first network entity may determine the second beam based on the information indicative of the second beam. For example, referring to FIG. 8, the UE 804 may obtain, from the function, the information indicative of the second beam. The UE 804, at 812, may determine the second beam based on the information indicative of the second beam.

In some aspects, the function may be configured independent of signaling from the second network entity. For example, referring to FIG. 8, the function may be configured independent of signaling from the network node 802.

In some aspects, the first network entity may be configured to generate the function based on the beam training information. For example, referring to FIG. 8, the UE 804 may be configured to generate the function based on the beam training information. For example, the UE 804 may be configured to generate the function based on the beam training information generated during the beam training procedure for the first frequency band. That is, the UE 804 may generate the function after the UE 804 determines the second beam index for the second frequency band for a particular foldable configuration at 812 based on the first beam index determined at 810 for the first antenna array in accordance with Equation 1 or Equation 2.

At 1216, the first network entity may transmit, to the second network entity, information indicative of the second beam. For example, referring to FIG. 8, the UE 804, at 814, may transmit, to the network node 802, information indicative of the second beam. For example, the UE 804 may indicate to the network node 802 a beam index of the second beam.

In some aspects, at 1218, the first network entity may, in response to determining the second beam based on the first beam, transmit a notification to the second network entity to switch beams. For example, referring to FIG. 8, the UE 804 may, in response to determining the second beam based on the first beam at 812, transmit a notification to the network node 802 to switch beams. The indication may be transmitted at 814.

In some aspects, the first network entity may transmit, to the second entity, information indicative of at least one of a change in a TCI state associated with the second beam, a change in CORESET pool index associated with the second beam, or a change in a QCL type configuration associated with the second beam. For example, referring to FIG. 8, the UE 804 may, in response to determining the second beam based on the first beam at 812, transmit, to the network node 802, information indicative of at least one of a change in a TCI state associated with the second beam, a change in CORESET pool index associated with the second beam, or a change in a QCL type configuration associated with the second beam. The indication may be transmitted at 814, for example, via the notification.

In some aspects, the first network entity may, in response to determining the second beam based on the first beam, transmit a notification to the second network entity to switch from a third beam corresponding to the first beam to a fourth beam corresponding to the second beam. For example, referring to FIG. 8, the UE 804 may, in response to determining the second beam based on the first beam, transmit a notification to the network node 802 to switch from a third beam corresponding to the first beam to a fourth beam corresponding to the second beam. The indication may be transmitted at 814.

In some aspects, the notification includes information indicative of at least one of a change in a TCI state corresponding to a switch from the third beam to the fourth beam at the second network entity, a change in a CORESET pool index corresponding to the switch from the third beam to the fourth beam at the second network entity, or a change in a QCL type configuration corresponding to the switch from the third beam to the fourth beam at the second network entity. For example, referring to FIG. 8, the notification (e.g., transmitted at 814) may include information indicative of at least one of a change in a TCI state corresponding to a switch from the third beam to the fourth beam at the network node 802, a change in a CORESET pool index corresponding to the switch from the third beam to the fourth beam at the network node 802, or a change in a QCL type configuration corresponding to the switch from the third beam to the fourth beam at the network node 802.

Figure 13:
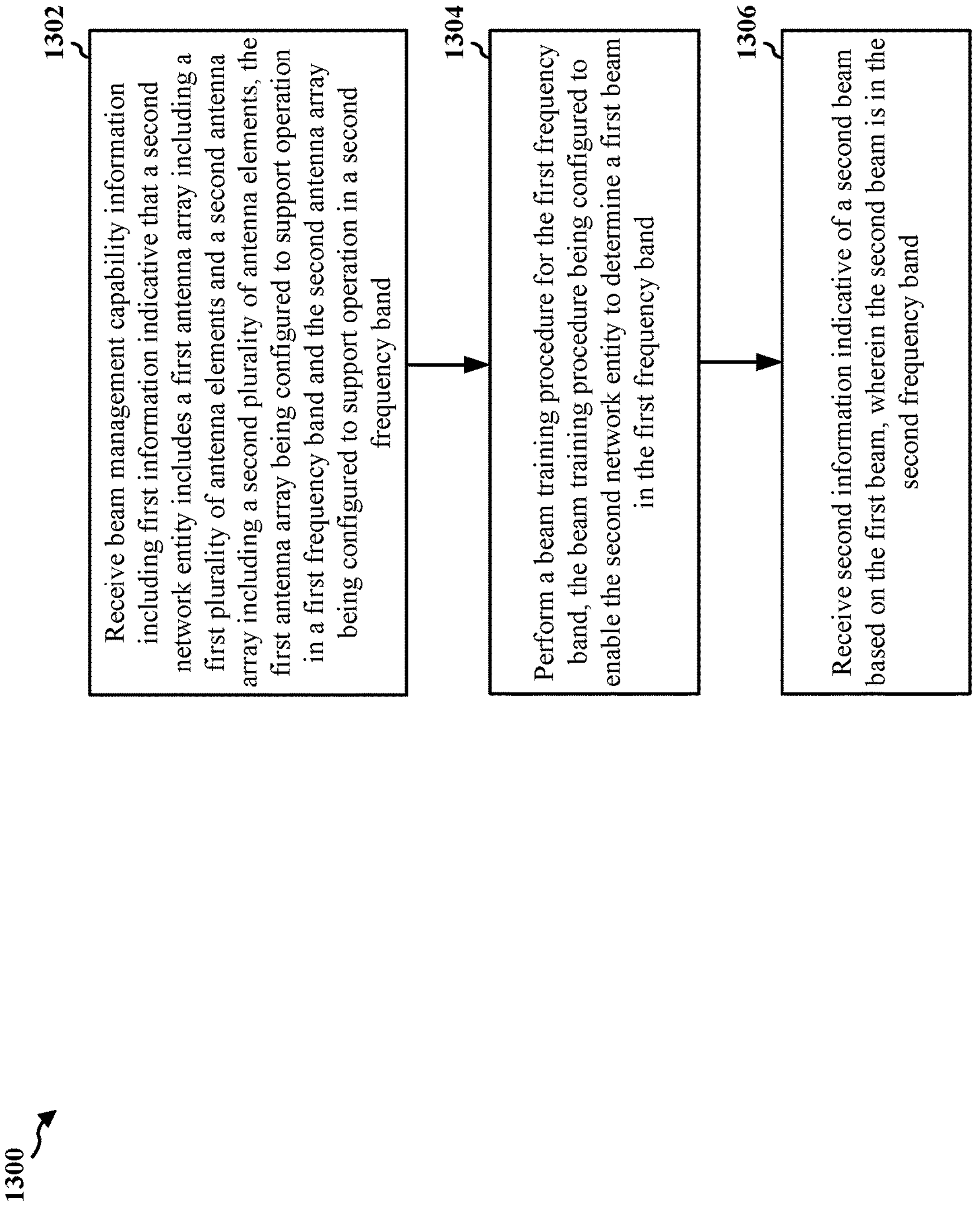
FIG. 13 is a flowchart illustrating methods of wireless communication at a first network entity in accordance with various aspects of the present disclosure.

FIG. 13 is a flowchart 1300 illustrating methods of wireless communication at a first network entity in accordance with various aspects of the present disclosure. In some aspects, the first network entity may be a network node. The network node may be a base station, or a component of a base station, in the access network of FIG. 1 or a core network component (e.g., base station 102, 310; the CU 110, the DU 130; the RU 140; the base station 402, the network node 702 or 802; or the network entity 1602 in the hardware implementation of FIG. 16).

At 1302, the first network entity may receive beam management capability information including first information indicative that a second network entity includes a first antenna array including a first plurality of antenna elements and a second antenna array including a second plurality of antenna elements, the first antenna array being configured to support operation in a first frequency band and the second antenna array being configured to support operation in a second frequency band. For example, referring to FIG. 8, the network node 802, at 806, may receive, from the UE 804, beam management capability information including first information indicative that a second network entity includes a first antenna array including a first plurality of antenna elements and a second antenna array including a second plurality of antenna elements, the first antenna array being configured to support operation in a first frequency band and the second antenna array being configured to support operation in a second frequency band. In an aspect, 1302 may be performed by the beam management component 199.

In some aspects, the first frequency band may correspond to a first frequency range and the second frequency band may correspond to a second frequency range.

In some aspects, the first frequency range and the second frequency range may be non-overlapping.

In some aspects, the beam management capability information may further include third information indicative of the second network entity supporting the first frequency band the second frequency band. For example, referring to FIG. 8, the beam management capability information received by the network node 802 at 806 may further include third information indicative of the second network entity supporting the first frequency band the second frequency band.

At 1304, the first network entity may perform a beam training procedure for the first frequency band, the beam training procedure being configured to enable the second network entity to determine a first beam in the first frequency band. For example, referring to FIG. 8, the network node 802, at 808, may perform a beam training procedure for the first frequency band, the beam training procedure being configured to enable the second network entity to determine a first beam in the first frequency band. In an aspect, 1304 may be performed by the beam management component 199.

In some aspects, the first network entity may provide a plurality of beams in the first frequency band. For example, with reference to FIG. 8, at 808, the network node 802 may provide to the UE 804 a plurality of beams in the first frequency band. As described above, the UE 804 may generate beam training information based on the plurality of beams and utilize the beam training information to determine the first beam.

In some aspects, the first network entity may receive information indicative of the first beam determined from plurality of beams. For example, referring to FIG. 8, the network node 802 may receive, from the UE 804, information indicative of the first beam determined from plurality of beams. The information may include a beam index of the first beam.

In some aspects, the first network entity may transmit a respective weight for each direction of a plurality of directions in a coverage region associated with the first beam. For example, with reference to FIG. 8, the network node 802 may receive an indication of a first beam index of the first beam selected by the UE 804 and/or the coverage region of the first beam. The network node 802 may determine a respective weight for a plurality of directions in the coverage region based on the first beam and transmit the weights to the UE 804. As described above, the UE 804 may utilize the weights to determine the projection of energy of candidate beams in accordance with Equation 1 or Equation 2.

At 1306, the first network entity may receive second information indicative of a second beam based on the first beam, where the second beam is in the second frequency band. For example, referring to FIG. 8, the network node 802, at 814, may receive, from the UE 804 second information indicative of a second beam based on the first beam. The second beam may be in the second frequency band. In an aspect, 1306 may be performed by the beam management component 199.

In some aspects, the first network entity may receive third information indicative of at least one of a change in a TCI state associated with the second beam, a change in a CORESET pool index associated with the second beam, or a change in a QCL type configuration associated with the second beam.

In some aspects, the first network entity may receive a notification to switch from a third beam corresponding to the first beam to a fourth beam corresponding to the second beam. For example, with reference to FIG. 8, the network node 802 may receive a notification from the UE 804 to switch from a third beam corresponding to the first beam to a fourth beam corresponding to the second beam. The notification may be received at 814.

In some aspects, the notification includes information indicative of at least one of a change in a TCI state corresponding to a switch from the third beam to the fourth beam at the first network entity, a change in a CORESET pool index corresponding to the switch from the third beam to the fourth beam at the first network entity, or a change in a QCL type configuration corresponding to the switch from the third beam to the fourth beam at the first network entity. For example, referring to FIG. 8, the indication (e.g., transmitted at 814) may include information indicative of at least one of a change in a TCI state corresponding to a switch from the third beam to the fourth beam at the network node 802, a change in a CORESET pool index corresponding to the switch from the third beam to the fourth beam at the network node 802, or a change in a QCL type configuration corresponding to the switch from the third beam to the fourth beam at the network node 802.

Figure 14:
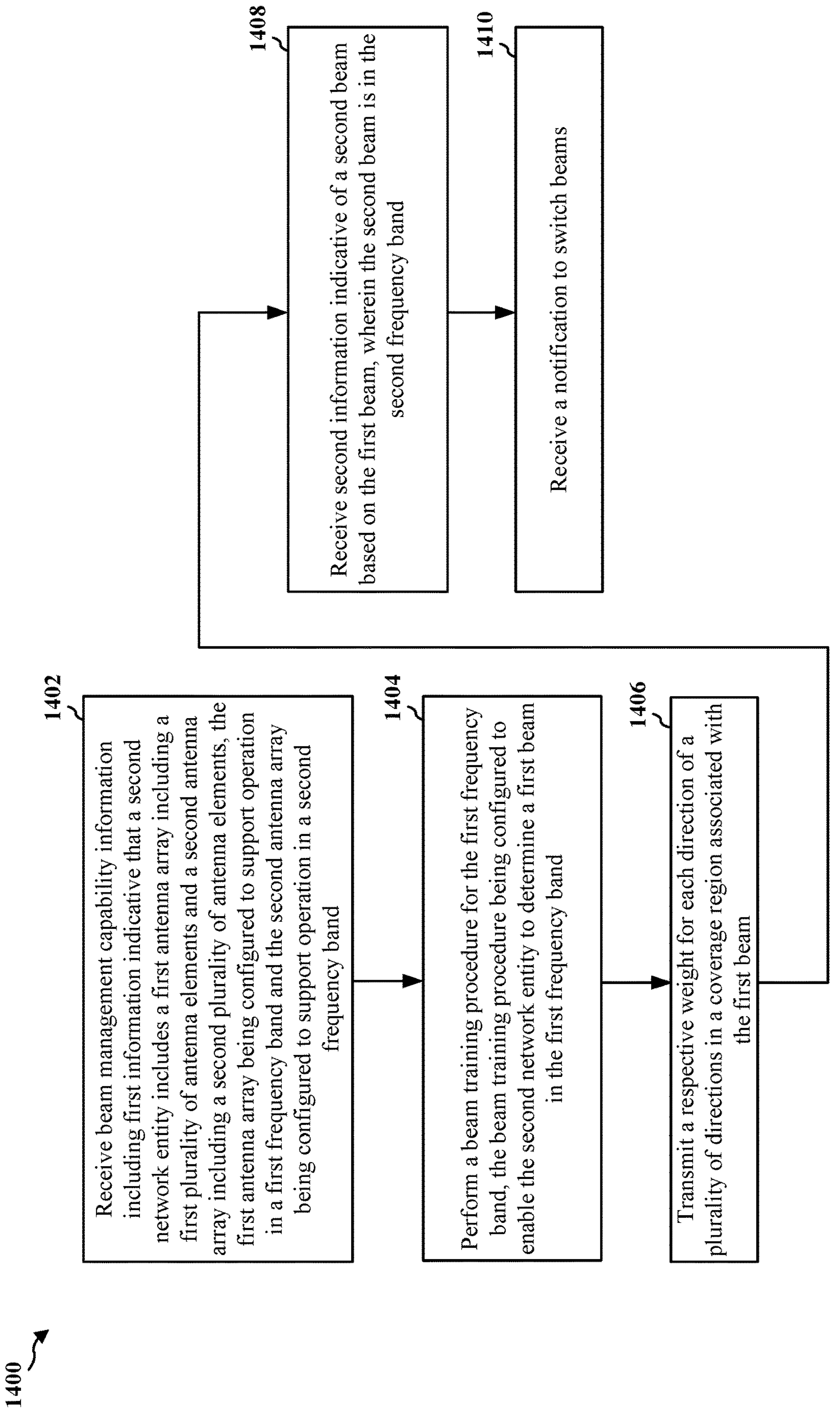
FIG. 14 is a flowchart illustrating methods of wireless communication at a first network entity in accordance with various aspects of the present disclosure.

FIG. 14 is a flowchart 1400 illustrating methods of wireless communication at a first network entity in accordance with various aspects of the present disclosure. In some aspects, the first network entity may be a network node. The network node may be a base station, or a component of a base station, in the access network of FIG. 1 or a core network component (e.g., base station 102, 310; the CU 110, the DU 130; the RU 140; the base station 402, the network node 702 or 802; or the network entity 1602 in the hardware implementation of FIG. 16).

At 1402, the first network entity may receive beam management capability information including first information indicative that a second network entity includes a first antenna array including a first plurality of antenna elements and a second antenna array including a second plurality of antenna elements, the first antenna array being configured to support operation in a first frequency band and the second antenna array being configured to support operation in a second frequency band. For example, referring to FIG. 8, the network node 802, at 806, may receive, from the UE 804, beam management capability information including first information indicative that a second network entity includes a first antenna array including a first plurality of antenna elements and a second antenna array including a second plurality of antenna elements, the first antenna array being configured to support operation in a first frequency band and the second antenna array being configured to support operation in a second frequency band.

In some aspects, the first frequency band may correspond to a first frequency range and the second frequency band may correspond to a second frequency range.

In some aspects, the first frequency range and the second frequency range may be non-overlapping.

In some aspects, the beam management capability information may further include third information indicative of the second network entity supporting the first frequency band the second frequency band. For example, referring to FIG. 8, the beam management capability information received by the network node 802 at 806 may further include third information indicative of the second network entity supporting the first frequency band the second frequency band.

At 1404, the first network entity may perform a beam training procedure for the first frequency band, the beam training procedure being configured to enable the second network entity to determine a first beam in the first frequency band. For example, referring to FIG. 8, the network node 802, at 808, may perform a beam training procedure for the first frequency band, the beam training procedure being configured to enable the second network entity to determine a first beam in the first frequency band.

In some aspects, the first network entity may provide a plurality of beams in the first frequency band. For example, with reference to FIG. 8, at 808, the network node 802 may provide to the UE 804 a plurality of beams in the first frequency band. As described above, the UE 804 may generate beam training information based on the plurality of beams and utilize the beam training information to determine the first beam.

In some aspects, the first network entity may receive information indicative of the first beam determined from plurality of beams. For example, referring to FIG. 8, the network node 802 may receive, from the UE 804, information indicative of the first beam determined from plurality of beams. The information may include a beam index of the first beam.

At 1406, the first network entity may transmit a respective weight for each direction of a plurality of directions in a coverage region associated with the first beam. For example, with reference to FIG. 8, the network node 802 may receive an indication of a first beam index of the first beam selected by the UE 804 and/or the coverage region of the first beam. The network node 802 may determine a respective weight for a plurality of directions in the coverage region based on the first beam and transmit the weights to the UE 804. As described above, the UE 804 may utilize the weights to determine the projection of energy of candidate beams in accordance with Equation 1 or Equation 2.

At 1408, the first network entity may receive second information indicative of a second beam based on the first beam, where the second beam is in the second frequency band. For example, referring to FIG. 8, the network node 802, at 814, may receive, from the UE 804 second information indicative of a second beam based on the first beam. The second beam may be in the second frequency band.

At 1410, the first network entity may receive a notification to switch beams. For example, referring to FIG. 8, the network node 802 may receive, from the UE 804, a notification to the network node 802 to switch beams. The indication may be transmitted at 814.

In some aspects, the first network entity may receive third information indicative of at least one of a change in a TCI state associated with the second beam, a change in a CORESET pool index associated with the second beam, or a change in a QCL type configuration associated with the second beam.

In some aspects, the first network entity may receive a notification to switch from a third beam corresponding to the first beam to a fourth beam corresponding to the second beam. For example, with reference to FIG. 8, the network node 802 may receive a notification from the UE 804 to switch from a third beam corresponding to the first beam to a fourth beam corresponding to the second beam. The notification may be received at 814.

In some aspects, the notification includes information indicative of at least one of a change in a TCI state corresponding to a switch from the third beam to the fourth beam at the first network entity, a change in a CORESET pool index corresponding to the switch from the third beam to the fourth beam at the first network entity, or a change in a QCL type configuration corresponding to the switch from the third beam to the fourth beam at the first network entity. For example, referring to FIG. 8, the indication (e.g., transmitted at 814) may include information indicative of at least one of a change in a TCI state corresponding to a switch from the third beam to the fourth beam at the network node 802, a change in a CORESET pool index corresponding to the switch from the third beam to the fourth beam at the network node 802, or a change in a QCL type configuration corresponding to the switch from the third beam to the fourth beam at the network node 802.

Figure 15:
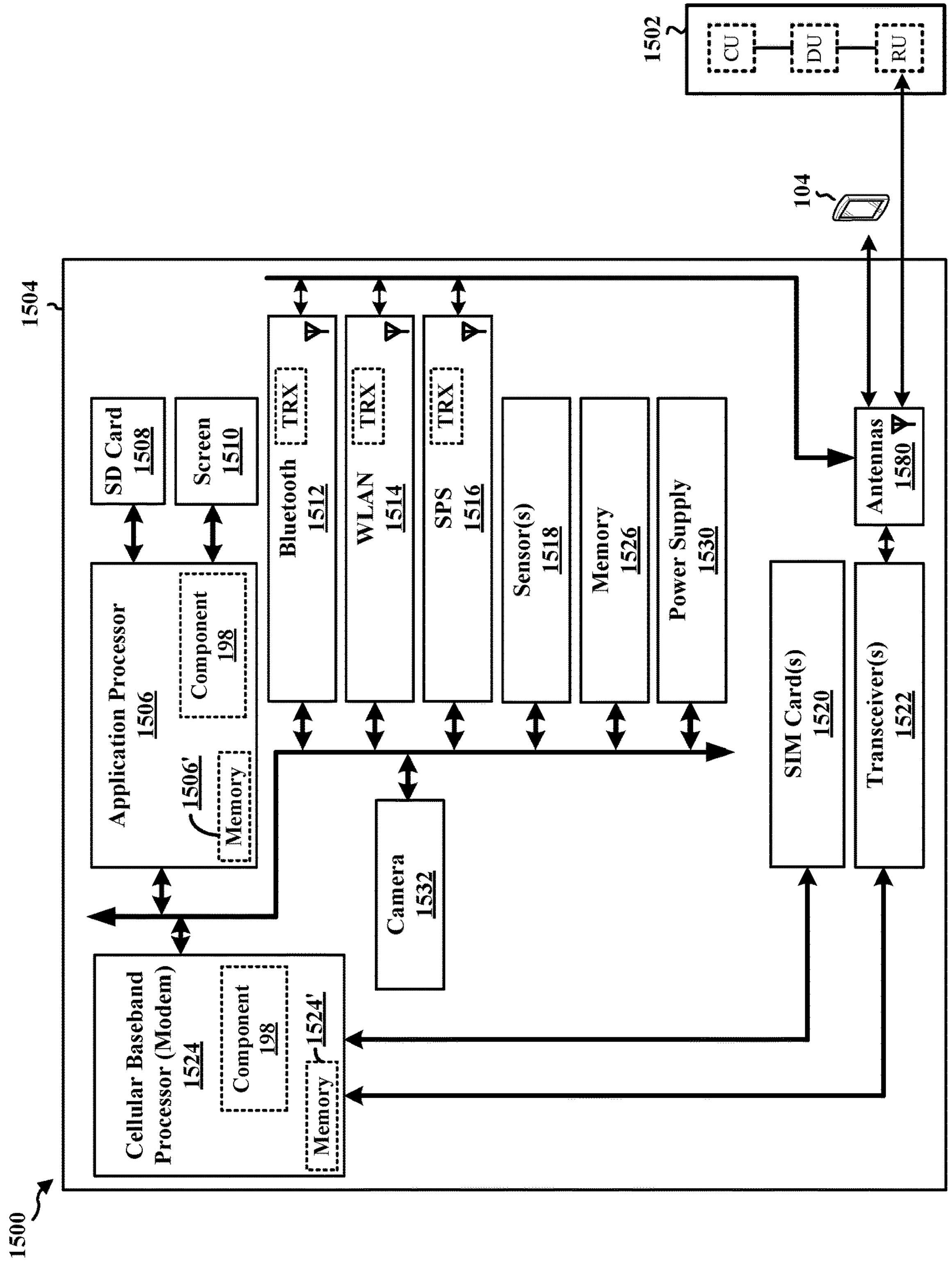
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include a cellular baseband processor 1524 (also referred to as a modem) coupled to one or more transceivers 1522 (e.g., cellular RF transceiver). The cellular baseband processor 1524 may include on-chip memory 1524'. In some aspects, the apparatus 1504 may further include one or more subscriber identity modules (SIM) cards 1520 and an application processor 1506 coupled to a secure digital (SD) card 1508 and a screen 1510. The application processor 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor 1524 communicates through the transceiver(s) 1522 via one or more antennas 1580 with the UE 104 and/or with an RU associated with a network entity 1502. The cellular baseband processor 1524 and the application processor 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor 1524 and the application processor 1506 are each responsible for general processing, including the execution of software stored on the computer-readable medium/memory. The software, when executed by the cellular baseband processor 1524/application processor 1506, causes the cellular baseband processor 1524/application processor 1506 to perform the various functions described supra. For example, the software may cause the cellular baseband processor 1524/application processor 1506 to transmit, signals, data, or information (collectively, signals). Causing transmission may include providing signals to one or more components. In some aspects, the one or more components may include a communication interface, one or more antenna arrays (e.g., the antennas 1580), or a combination thereof. The communication interface may be configured to receive and/or to transmit signals via a wired or wireless transmission medium. The communication interface may be configured to communicate with one or more other components, such as the antenna array(s), via the transmission medium. For example, the communication interface may include a wired interface configured to receive and/or to transmit signals over a wired transmission medium. The communication interface may also include a wireless interface (e.g., a receiver, a transmitter, or a transceiver (e.g., the transceiver(s) 1522)) configured to receive and/or to transmit signals over a wireless transmission medium. The computer-readable medium/memory may also be used for storing data that is manipulated by the cellular baseband processor 1524/application processor 1506 when executing software. The cellular baseband processor 1524/application processor 1506 may be a component of the UE 350 and may include the memory 360 and/or at least one of the TX processor 368, the RX processor 356, and the controller/processor 359. In one configuration, the apparatus 1504 may be a processor chip (modem and/or application) and include just the cellular baseband processor 1524 and/or the application processor 1506, and in another configuration, the apparatus 1504 may be the entire UE (e.g., see UE 350 of FIG. 3) and include the additional modules of the apparatus 1504.

As discussed supra, the component 198 may be configured to cause transmission, to a network entity, of beam management capability information including first information indicative that the first network entity includes the first antenna array and the second antenna array, the first antenna array being configured to support operation in a first frequency band and the second antenna array being configured to support operation in a second frequency band, to determine a first beam in the first frequency band based on beam training information corresponding to the first frequency band, to determine a second beam based on the first beam, the second beam being in the second frequency band, and cause transmission, to the network entity, of information indicative of the second beam. The component 198 may be configured to perform any of the aspects described in connection with the flowchart in FIGS. 9-12 and/or the aspects performed by the UE 804 in the communication flow in FIG. 8. The component 198 may be within the cellular baseband processor 1524, the application processor 1506, or both the cellular baseband processor 1524 and the application processor 1506. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 1504 may include a variety of components configured for various functions. In one configuration, the apparatus 1504, and in particular the cellular baseband processor 1524 and/or the application processor 1506, may include means for causing transmission, to a network entity, of beam management capability information including first information indicative that the first network entity includes the first antenna array and the second antenna array, the first antenna array being configured to support operation in a first frequency band and the second antenna array being configured to support operation in a second frequency band, means for determining a first beam in the first frequency band based on beam training information corresponding to the first frequency band, means for determining a second beam based on the first beam, the second beam being in the second frequency band, and means for causing transmission, to the network entity, of information indicative of the second beam. The means may be the component 198 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

Figure 16:
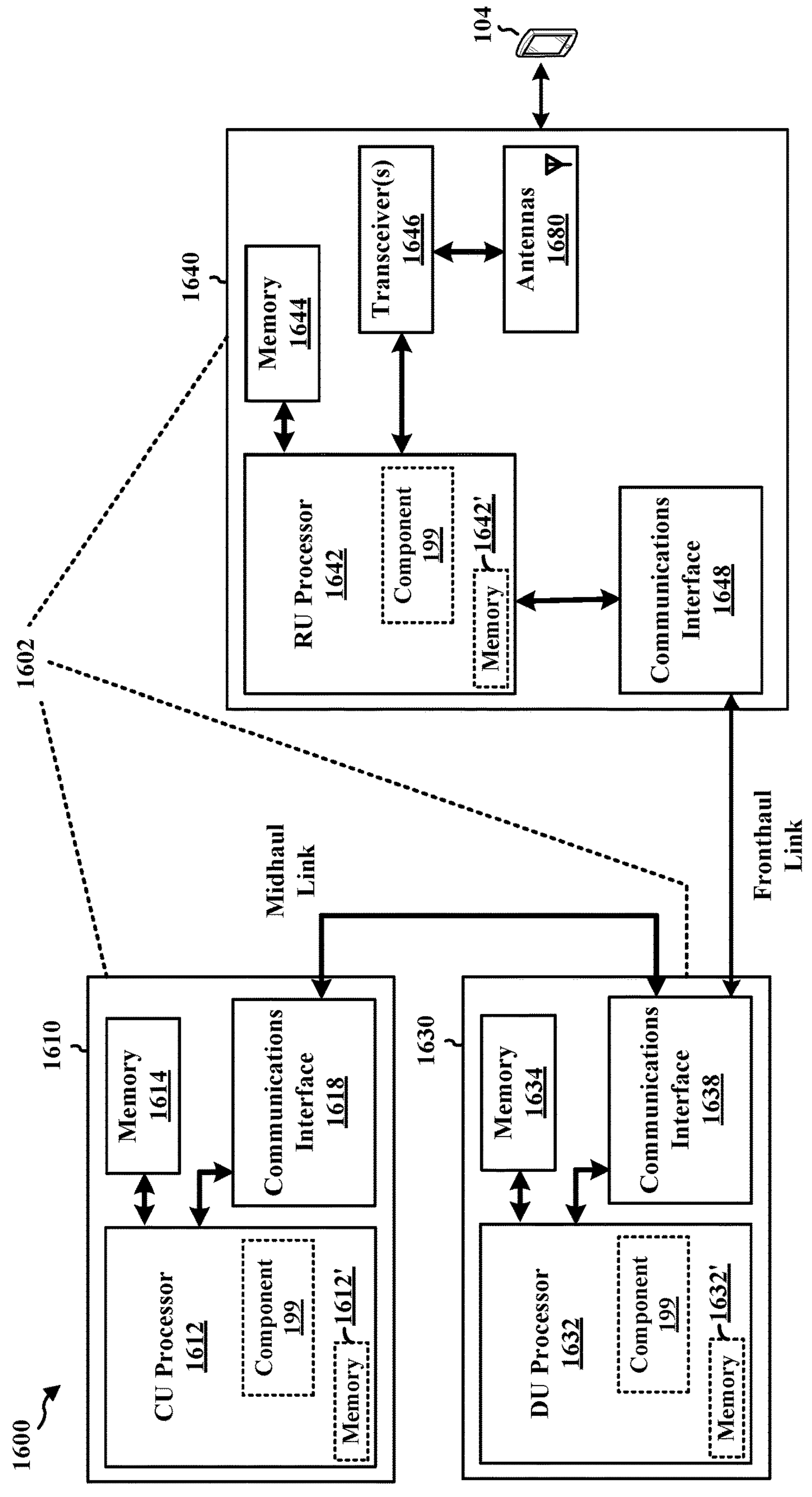
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include a CU processor 1612. The CU processor 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include a DU processor 1632. The DU processor 1632 may include on-chip memory 1632'. In some aspects, the DU 1630 may further include additional memory modules 1634 and a communications interface 1638. The DU 1630 communicates with the RU 1640 through a fronthaul link. The RU 1640 may include an RU processor 1642. The RU processor 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive beam management capability information including first information indicative that a network entity includes a first antenna array including a first plurality of antenna elements and a second antenna array including a second plurality of antenna elements, the first antenna array being configured to support operation in a first frequency band and the second antenna array being configured to support operation in a second frequency band, to perform a beam training procedure for the first frequency band, the beam training procedure being configured to enable the network entity to determine a first beam in the first frequency band, and to receive second information indicative of a second beam based on the first beam, the second beam being in the second frequency band. The component 199 may be configured to perform any of the aspects described in connection with the flowchart in FIGS. 13-14 and/or the aspects performed by the network node 802 in the communication flow in FIG. 8. The component 199 may be within one or more processors of one or more of the CU 1610, DU 1630, and the RU 1640. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1602 may include a variety of components configured for various functions. In one configuration, the network entity 1602 may include means for receiving beam management capability information including first information indicative that a network entity includes a first antenna array including a first plurality of antenna elements and a second antenna array including a second plurality of antenna elements, the first antenna array being configured to support operation in a first frequency band and the second antenna array being configured to support operation in a second frequency band, means for performing a beam training procedure for the first frequency band, the beam training procedure being configured to enable the network entity to determine a first beam in the first frequency band, and means for receiving second information indicative of a second beam based on the first beam, the second beam being in the second frequency band. The means may be the component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

Various aspects relate generally to wireless communication and particularly to deterministic beam management for multiple antenna arrays supporting a plurality of frequency bands. Some aspects more specifically relate to determining a beam for one frequency band based on a beam determined for another frequency band via beam training. In some examples, a first antenna array of a UE may support operation in a first frequency band, and a second antenna array of the UE may support operation in a second frequency band. The UE may determine a first beam in the first frequency band via a beam training procedure performed for the first antenna array. The UE may then deterministically determine a second beam in the second frequency band based on characteristics of the first beam (e.g., a coverage region of the first beam) and characteristics of the first antenna array and the second antenna array (e.g., an angle of separation between the first antenna array and the second antenna). The UE may deterministically determine the second beam without performing a beam training procedure for the second antenna array.

Particular aspects of the subject matter described in this disclosure can be implemented to realize one or more of the following potential advantages. In some examples, by deterministically determining a particular beam for a particular frequency band rather than determining a beam via a beam training procedure, aspects provided herein can reduce the reference signal resources, latencies, power/thermal overheads, bootstrapping across frequencies, processing cycles, etc., that are normally incurred during the beam training procedure.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first network entity, including transmitting, to a second network entity, beam management capability information including first information indicative that the first network entity includes the first antenna array and the second antenna array, the first antenna array including a first plurality of antenna elements and being configured to support operation in a first frequency band and the second antenna array including a second plurality of antenna elements and being configured to support operation in a second frequency band; determining a first beam in the first frequency band based on beam training information corresponding to the first frequency band; determining a second beam based on the first beam, where the second beam is in the second frequency band; and transmitting, to the second network entity, information indicative of the second beam.

Aspect 2 is the method of aspect 1, where the beam training information includes respective measurement information corresponding to each beam of a plurality of beams in the first frequency band, and where the plurality of beams includes the first beam.

Aspect 3 is the method of any of aspects 1 and 2, further including: receiving, via the first antenna array, a plurality of beams in the first frequency band, where the plurality of beams includes the first beam; and performing, based on the plurality of beams, a beam training procedure corresponding to the first antenna array, where performing the beam training procedure includes generating the beam training information.

Aspect 4 is the method of aspect 3, where determining the second beam based on the first beam includes determining the second beam without performance of a beam training procedure corresponding to the second antenna array.

Aspect 5 is the method of any of aspects 1 to 4, where the beam management capability information further includes second information indicative of the first network entity supporting the first frequency band and the second frequency band.

Aspect 6 is the method of any of aspects 1 to 5, further including: transmitting, to the second network entity, information indicative of at least one of: a change in a TCI state associated with the second beam; a change in a CORESET pool index associated with the second beam; or a change in a QCL type configuration associated with the second beam.

Aspect 7 is the method of any of aspects 1 to 6, further including: transmitting a notification to the second network entity to switch from a third beam corresponding to the first beam to a fourth beam corresponding to the second beam.

Aspect 8 is the method of aspect 7, where the notification includes information indicative of at least one of: a change in a TCI state corresponding to a switch from the third beam to the fourth beam at the second network entity; a change in a CORESET pool index corresponding to a switch from the third beam to the fourth beam at the second network entity; or a change in a QCL type configuration corresponding to a switch from the third beam to the fourth beam at the second network entity.

Aspect 9 is the method of any of aspects 1 to 8, where the first antenna array and the second antenna array have a same boresight direction.

Aspect 10 is the method of aspect 9, where determining the second beam based on the first beam includes: determining, for each beam of a plurality of beams supported in the second frequency band, a respective projection of energy in a coverage region of the first beam; and determining a particular beam from the plurality of beams corresponding to a largest projection of energy, where the particular beam is the second beam.

Aspect 11 is the method of aspect 10, where determining the respective projection of energy includes: for each respective direction of a plurality of directions in the coverage region: combining a respective conjugate transpose of a beamforming vector representing the beam of the plurality of beams with a respective steering vector associated with the respective direction to generate a respective combined value; and applying a respective weight associated with the respective direction to the respective combined value to generate a respective weighted combined value, where the respective projection of energy of the beam in the coverage region of the first beam is based on the respective weighted combined value generated for each respective direction of the plurality of directions.

Aspect 12 is the method of aspect 11, where each respective weight is configured independent of signaling from the second network entity.

Aspect 13 is the method of aspect 11, further including: receiving, from the second network entity, each respective weight associated with each respective direction of the plurality of directions in the coverage region.

Aspect 14 is the method of any of aspects 1 to 8, where the first antenna array has a first boresight direction and the second antenna array has a second boresight direction that is different than the first boresight direction.

Aspect 15 is the method of aspect 14, where determining the second beam based on the first beam includes: determining, for each beam of a plurality of beams supported in the second frequency band, a respective projection of energy in a coverage region of the first beam: and combining an RSRP of the first beam with the respective projection of energy to generate a first combined value; and determining a particular beam from the plurality of beams corresponding to a largest first combined value, where the particular beam is the second beam.

Aspect 16 is the method of aspect 15, where determining the respective projection of energy includes: for each respective direction of a plurality of directions in the coverage region, combining a respective conjugate transpose of a beamforming vector representing the beam of the plurality of beams with a respective steering vector associated the respective direction to generate a respective second combined value; and applying a respective weight associated with the respective direction to the respective second combined value to generate a respective weighted combined value; where the respective projection of energy of the beam in the coverage region of the first beam is based on the respective weighted combined value generated for each respective direction of the plurality of directions.

Aspect 17 is the method of aspect 16, where each respective weight is configured independent of signaling from the second network entity.

Aspect 18 is the method of aspect 16, further including: receiving from the second network entity, each respective weight associated with each respective direction of the plurality of directions in the coverage region.

Aspect 19 is the method of any of aspects 1 to 8, where the information indicative of the second beam is based on information indicative of the first beam and information indicative of a configuration of a plurality of configurations of the first antenna array and the second antenna array.

Aspect 20 is the method of any of aspects 1 to 8 and 19, where the first antenna array and the second antenna array are configurable into a plurality of configurations, the method further including: inputting, into a function, information indicative of the first beam and information indicative of a configuration of the plurality of configurations; and obtaining, from the function, the information indicative of the second beam, where determining the second beam includes determining the second beam based on the information indicative of the second beam.

Aspect 21 is the method of aspect 20, where the function is configured independent of signaling from the second network entity.

Aspect 22 is the method of aspect 20, further including: generating the function based on the beam training information.

Aspect 23 is the method of any of aspects 1 to 22, where the first frequency band corresponds to a first frequency range and the second frequency band corresponds to a second frequency range.

Aspect 24 is the method of aspect 23, where the first frequency range and the second frequency range are non-overlapping.

Aspect 25 is a method of wireless communication at a first network entity, including: receiving beam management capability information including first information indicative that a second network entity includes a first antenna array including a first plurality of antenna elements and a second antenna array including a second plurality of antenna elements, the first antenna array being configured to support operation in a first frequency band and the second antenna array being configured to support operation in a second frequency band; performing a beam training procedure for the first frequency band, the beam training procedure being configured to enable the second network entity to determine a first beam in the first frequency band; and receiving second information indicative of a second beam based on the first beam, where the second beam is in the second frequency band.

Aspect 26 is the method of aspect 25, where the beam management capability information further includes third information indicative of the second network entity supporting the first frequency band and the second frequency band.

Aspect 27 is the method of aspects 25 and 26, where performing the beam training procedure includes: provide a plurality of beams in the first frequency band.

Aspect 28 is the method of aspects 25 to 27, further including: receiving information indicative of the first beam, the first beam being determined from plurality of beams.

Aspect 29 is the method of aspects 25 to 28, further including: receiving third information indicative of at least one of: a change in a TCI state associated with the second beam; a change in a CORESET pool index associated with the second beam; or a change in a QCL type configuration associated with the second beam.

Aspect 30 is the method of aspects 25 to 29, further including: receiving a notification to switch from a third beam corresponding to the first beam to a fourth beam corresponding to the second beam.

Aspect 31 is the method of aspect 30, where the notification includes information indicative of at least one of: a change in a TCI state corresponding to a switch from the third beam to the fourth beam at the second network entity; a change in a CORESET pool index to a switch from the third beam to the fourth beam at the second network entity; or a change in a QCL type configuration to a switch from the third beam to the fourth beam at the second network entity.

Aspect 32 is the method of any of aspects 25 to 31, further including: transmitting a respective weight for each direction of a plurality of directions in a coverage region associated with the first beam.

Aspect 33 is the method of any of aspects 25 to 32, where the first frequency band corresponds to a first frequency range and the second frequency band corresponds to a second frequency range.

Aspect 34 is the method of aspect 33, where the first frequency range and the second frequency range are non-overlapping.

Aspect 35 is a method of wireless communication at a first network entity, including: receiving beam management capability information including first information indicative that a second network entity includes a first antenna array including a first plurality of antenna elements and a second antenna array including a second plurality of antenna elements, the first antenna array being configured to support operation in a first frequency band and the second antenna array being configured to support operation in a second frequency band; providing a plurality of beams in the first frequency band; receiving, from the second network entity, second information indicative of a first beam determined from the plurality of beams; and receiving, from the second network entity, third information indicative of a second beam based on the first beam, where the second beam is in the second frequency band.

Aspect 36 is the method of aspect 35, where the beam management capability information further includes fourth information indicative of the second network entity supporting the first frequency band and the second frequency band.

Aspect 37 is the method of aspects 35 and 36, further including: receiving fourth information indicative of at least one of: a change in a TCI state associated with the second beam; a change in a CORESET pool index associated with the second beam; or a change in a QCL type configuration associated with the second beam.

Aspect 38 is the method of aspects 35 to 37, further including: receiving a notification to switch from a third beam corresponding to the first beam to a fourth beam corresponding to the second beam.

Aspect 39 is the method of aspect 38, where the notification includes information indicative of at least one of: a change in a TCI state corresponding to a switch from the third beam to the fourth beam at the second network entity; a change in a CORESET pool index to a switch from the third beam to the fourth beam at the second network entity; or a change in a QCL type configuration to a switch from the third beam to the fourth beam at the second network entity.

Aspect 40 is the method of any of aspects 35 to 39, further including: transmitting a respective weight for each direction of a plurality of directions in a coverage region associated with the first beam.

Aspect 41 is the method of any of aspects 35 to 40, where the first frequency band corresponds to a first frequency range and the second frequency band corresponds to a second frequency range.

Aspect 42 is the method of aspect 41, where the first frequency range and the second frequency range are non-overlapping.

Aspect 43 is an apparatus for wireless communication at a first network entity. The apparatus includes a memory; and at least one processor coupled to the memory, the at least one processor is configured to implement any of aspects 1 to 24.

Aspect 44 is the apparatus of aspect 43, further including at least one of a transceiver or an antenna coupled to the at least one processor.

Aspect 44 is an apparatus for wireless communication at a first network entity. The apparatus includes a memory; and at least one processor coupled to the memory, the at least one processor is configured to implement any of aspects 25 to 34.

Aspect 45 is the apparatus of aspect 44, further including at least one of a transceiver or an antenna coupled to the at least one processor.

Aspect 46 is an apparatus for wireless communication at a first network entity. The apparatus includes a memory; and at least one processor coupled to the memory, the at least one processor is configured to implement any of aspects 35 to 42.

Aspect 47 is the apparatus of aspect 46, further including at least one of a transceiver or an antenna coupled to the at least one processor.

Aspect 48 is an apparatus for wireless communication including means for implementing any of aspects 1 to 24.

Aspect 49 is an apparatus for wireless communication including means for implementing any of aspects 25 to 34.

Aspect 50 is an apparatus for wireless communication including means for implementing any of aspects 35 to 42.

Aspect 51 is a computer-readable medium (e.g., a non-transitory computer-readable medium) storing computer executable code, where the code when executed by a processor causes the processor to implement any of aspects 1 to 24.

Aspect 52 is a computer-readable medium (e.g., a non-transitory computer-readable medium) storing computer executable code, where the code when executed by a processor causes the processor to implement any of aspects 25 to 34.

Aspect 53 is a computer-readable medium (e.g., a non-transitory computer-readable medium) storing computer executable code, where the code when executed by a processor causes the processor to implement any of aspects 35 to 42.

What is claimed is:

1. A first network entity for wireless communication, comprising:

a first antenna array including a first plurality of antenna elements;

a second antenna array including a second plurality of antenna elements;

a memory; and at least one processor coupled to the memory, wherein the at least one processor is configured to:

cause transmission, to a second network entity, of beam management capability information comprising first information indicative that the first network entity comprises the first antenna array and the second antenna array, wherein the first antenna array is configured to support operation in a first frequency band and the second antenna array is configured to support operation in a second frequency band;

determine, based on beam training information corresponding to the first antenna array, a first beam index from one or more first beam indexes for a plurality of beams in the first frequency band;

determine a second beam index from one or more second beam indexes for a plurality of beams in the second frequency band, wherein the second beam index is determined based on an indication indicative of the first beam index and without performance of a beam training procedure corresponding to the second antenna array; and cause transmission, to the second network entity, of information indicative of the second beam index.

2. The first network entity of claim 1, wherein the beam training information includes respective measurement information corresponding to each beam of the plurality of beams in the first frequency band, and wherein the plurality of beams in the first frequency band includes a first beam corresponding to the first beam index.

3. The first network entity of claim 1, wherein the at least one processor is configured to:

receive, via the first antenna array, the plurality of beams in the first frequency band, wherein the plurality of beams in the first frequency band includes a first beam corresponding to the first beam index; and perform, based on the plurality of beams in the first frequency band, a beam training procedure corresponding to the first antenna array, wherein, to perform the beam training procedure, the at least one processor is configured to generate the beam training information.

4. The first network entity of claim 1, wherein the beam management capability information further comprises second information indicative of the first network entity supporting the first frequency band and the second frequency band.

5. The first network entity of claim 1, wherein the at least one processor is configured to:

cause transmission, to the second network entity, of information indicative of at least one of:

a change in a transmission configuration indicator (TCI) state associated with a second beam corresponding to the second beam index;

a change in a control resource set (CORESET) pool index associated with the second beam; or a change in a quasi-co-location (QCL) type configuration associated with the second beam.

6. The first network entity of claim 1, wherein the at least one processor is configured to:

cause transmission of a notification to the second network entity to switch from a third beam corresponding to the first beam index to a fourth beam corresponding to the second beam index.

7. The first network entity of claim 6, wherein the notification comprises information indicative of at least one of:

a change in a transmission configuration indicator (TCI) state corresponding to a switch from the third beam to the fourth beam at the second network entity;

a change in a control resource set (CORESET) pool index corresponding to the switch from the third beam to the fourth beam at the second network entity; or a change in a quasi-co-location (QCL) type configuration corresponding to the switch from the third beam to the fourth beam at the second network entity.

8. The first network entity of claim 1, wherein the first antenna array and the second antenna array have a same boresight direction.

9. The first network entity of claim 1, wherein to determine the second beam index based on the first beam index, the at least one processor is configured to:

determine, for each beam of the plurality of beams in the second frequency band, a respective projection of energy in a coverage region of a first beam corresponding to the first beam index; and determine a particular beam from the plurality of beams in the second frequency band corresponding to a largest projection of energy, wherein a beam index of the particular beam is the second beam index.

10. The first network entity of claim 9, wherein to determine the respective projection of energy, the at least one processor is configured to:

for each respective direction of a plurality of directions in the coverage region:

combine a respective conjugate transpose of a beamforming vector representing the beam of the plurality of beams with a respective steering vector associated with the respective direction to generate a respective combined value; and apply a respective weight associated with the respective direction to the respective combined value to generate a respective weighted combined value;

wherein the respective projection of energy of the beam in the coverage region of the first beam is based on the respective weighted combined value generated for each respective direction of the plurality of directions.

11. The first network entity of claim 10, wherein each respective weight is configured independent of signaling from the second network entity.

12. The first network entity of claim 10, wherein the at least one processor is configured to receive, from the second network entity, each respective weight associated with each respective direction of the plurality of directions in the coverage region.

13. The first network entity of claim 1, wherein the first antenna array has a first boresight direction and the second antenna array has a second boresight direction that is different than the first boresight direction.

14. The first network entity of claim 13, wherein to determine the second beam index based on the first beam index, the at least one processor is configured to:

determine, for each beam of the plurality of beams in the second frequency band, a respective projection of energy in a coverage region of a first beam corresponding to the first beam index;

combine a reference signal received power (RSRP) of the first beam with the respective projection of energy to generate a first combined value; and determine a particular beam from the plurality of beams in the second frequency band corresponding to a largest first combined value, wherein a beam index of the particular beam is the second beam index.

15. The first network entity of claim 14, wherein to determine the respective projection of energy, the at least one processor is configured to:

for each respective direction of a plurality of directions in the coverage region:

combine a respective conjugate transpose of a beamforming vector representing the beam of the plurality of beams with a respective steering vector associated the respective direction to generate a respective second combined value; and apply a respective weight associated with the respective direction to the respective second combined value to generate a respective weighted combined value;

wherein the respective projection of energy of the beam in the coverage region of the first beam is based on the respective weighted combined value generated for each respective direction of the plurality of directions.

16. The first network entity of claim 15, wherein each respective weight is configured independent of signaling from the second network entity.

17. The first network entity of claim 15, wherein the at least one processor is configured to receive, from the second network entity, each respective weight associated with each respective direction of the plurality of directions in the coverage region.

18. The first network entity of claim 1, wherein the information indicative of the second beam index is based on information indicative of the first beam index and information indicative of a configuration of a plurality of configurations of the first antenna array and the second antenna array.

19. The first network entity of claim 1, wherein the first antenna array and the second antenna array are configurable into a plurality of configurations, wherein the at least one processor is configured to:

input, into a function, information indicative of the first beam index and information indicative of a configuration of the plurality of configurations; and obtain, from the function, the information indicative of the second beam index, and wherein to determine the second beam index, the at least one processor is configured to determine the second beam index based on the information indicative of the second beam index.

20. The first network entity of claim 19, wherein the function is configured independent of signaling from the second network entity.

21. The first network entity of claim 19, wherein the at least one processor is configured to generate the function based on the beam training information.

22. The first network entity of claim 1, wherein the first frequency band corresponds to a first frequency range and the second frequency band corresponds to a second frequency range.

23. The first network entity of claim 22, wherein the first frequency range and the second frequency range are non-overlapping.

24. A first network entity for wireless communication, comprising:

a memory; and at least one processor coupled to the memory, wherein the at least one processor is configured to:

receive beam management capability information comprising first information indicative that a second network entity comprises a first antenna array including a first plurality of antenna elements and a second antenna array including a second plurality of antenna elements, wherein the first antenna array is configured to support operation in a first frequency band and the second antenna array is configured to support operation in a second frequency band;

perform a beam training procedure for the first frequency band and without performance of a beam training procedure corresponding to the second antenna array, wherein the beam training procedure for the first frequency band is configured to enable the second network entity to determine a first beam index from one or more first beam indexes for a plurality of beams in the first frequency band; and receive second information indicative of a second beam index selected from one or more second beam indexes for a plurality of beams in the second frequency band based on the first beam index, wherein the second beam index corresponds to a second beam in the second frequency band.

25. The first network entity of claim 24, wherein the beam management capability information further comprises third information indicative of the second network entity supporting the first frequency band and the second frequency band.

26. The first network entity of claim 24, wherein the at least one processor is configured to:

receive third information indicative of at least one of:

a change in a transmission configuration indicator (TCI) state associated with a second beam corresponding to the second beam index;

a change in a control resource set (CORESET) pool index associated with the second beam; or a change in a quasi-co-location (QCL) type configuration associated with the second beam.

27. The first network entity of claim 24, wherein the at least one processor is configured to transmit a respective weight for each direction of a plurality of directions in a coverage region associated with the first beam.

28. A method of wireless communication at a first network entity, comprising:

transmitting, to a second network entity, beam management capability information comprising first information indicative that the first network entity comprises a first antenna array including a first plurality of antenna elements and a second antenna array including a second plurality of antenna elements, wherein the first antenna array is configured to support operation in a first frequency band and the second antenna array is configured to support operation in a second frequency band;

determining, based on beam training information corresponding to the first antenna array, a first beam index from one or more first beam indexes for a plurality of beams in the first frequency band;

determining a second beam index from one or more second beam indexes for a plurality of beams in the second frequency band, wherein the second beam index is determined based on an indication indicative of the first beam index and without performance of a beam training procedure corresponding to the second antenna array; and transmitting, to the second network entity, information indicative of the second beam index.

29. A method of wireless communication at a first network entity, comprising:

receiving beam management capability information comprising first information indicative that a second network entity comprises a first antenna array including a first plurality of antenna elements and a second antenna array including a second plurality of antenna elements, wherein the first antenna array is configured to support operation in a first frequency band and the second antenna array is configured to support operation in a second frequency band;

performing a beam training procedure for the first frequency band and without performance of a beam training procedure corresponding to the second antenna array, wherein the beam training procedure for the first frequency band is configured to enable the second network entity to determine a first beam index from one or more first beam indexes for a plurality of beams in the first frequency band; and receiving second information indicative of a second beam index selected from one or more second beam indexes for a plurality of beams in the second frequency band based on the first beam index, wherein the second beam index corresponds to a second beam in the second frequency band.

* * * * *